(12) United States Patent
Sevastyanov

(10) Patent No.: US 6,417,852 B2
(45) Date of Patent: Jul. 9, 2002

(54) METHOD OF VISUALIZATION AND GRAPHICAL ANALYSIS FOR MULTIDIMENSIONAL FUNCTIONS

(76) Inventor: Vladimir Sevastyanov, 1 Pazzi, Irvine, CA (US) 92614

( * ) Notice: Subject to any disclaimer, the term of this patent is extended or adjusted under 35 U.S.C. 154(b) by 0 days.

(21) Appl. No.: 09/766,462

(22) Filed: Jan. 19, 2001

Related U.S. Application Data

(60) Provisional application No. 60/188,336, filed on Mar. 9, 2000.

(51) Int. Cl.$^7$ ............................................... G06T 11/20
(52) U.S. Cl. ....................................................... 345/440
(58) Field of Search ......................................... 345/440

(56) References Cited

U.S. PATENT DOCUMENTS

RE36,840 E * 8/2000 Mihalisin et al. ........... 345/440

\* cited by examiner

*Primary Examiner*—Jeffery Brier
*Assistant Examiner*—Motilew Good-Johnson

(74) *Attorney, Agent, or Firm*—Leonard Tachner

(57) ABSTRACT

An interactive method of visualization and graphical analysis of functions considered in multi-dimensional domain is provided. The inventive method substitutes continuum objects represented by one or more functions by discrete approximation represented by a set of multi-dimensional points, to analyze the dataset graphically. The preferred embodiment of the method includes the steps of:

a) generating uniformly distributed sequence of points in the multi-dimensional domain;

b) calculating values of the function (or the system of functions) in the points of the uniformly distributed sequence, and create an approximation of the functions by discrete dataset;

c) determining a split-criterion for the purpose dividing the discrete dataset into several non intersecting subsets;

d) applying the split-criterion for each point of the discrete dataset, to determine in which subset a point belongs;

e) drawing each subset in a distinct color on a number of two- and three-dimensional projections to analyze graphically colored patterns on the projections.

21 Claims, 37 Drawing Sheets

(29 of 37 Drawing Sheet(s) Filed in Color)

METHOD OF VISUALIZATION AND GRAPHICAL ANALYSIS FOR MULTIDIMENSIONAL FUNCTIONS

CROSS-RELATED APPLICATIONS

This application claims priority from Provisional Patent Application Ser. No. 60/188,336 filed Mar. 9, 2000.

BACKGROUND OF THE INVENTION

1. Field of the Invention

This invention relates to visualization and graphical analysis of functions considered on multi-dimensional domain especially for multi-objective research objects.

2. Description of the Prior Art

In the 17th century R. Descartes discovered that it was very useful to combine two variables in a horizontal/vertical diagram (a Cartesian diagram/coordinate system). Moreover, this discovery made it much easier to see patterns than it had been previously. Later on the coordinate system was widely utilized for data and functions' visualization.

In recent years many different methods have been developed for multi-dimensional data analysis and visualization. But there are no new methods of visualization for multi-dimensional functions.

Consider a function of N independent variables $y=f(x_1, x_2, \ldots, x_N)$. All known methods of graphical analysis for such functions are based on a very old tradition (at least 300 years old). Such methods reduce the number of independent variables by assigning a number of constant values to some of the variables. The resulting function is a function of one or two variables, and can be drawn without any difficulties. Consider the two most popular methods of graphical visualization for the following functions:

1. Assign constant values to all independent variables except of the first one: $x_2=p_1; x_3=C_3 \ldots, x_N=C_N$, where $_1$ is a parameter value, and than draw a one-dimensional dependency $y=f_1(x_1)$ in axes $(y,x_1)$; assign another parameter value $x_2=p_2$ and draw another one-dimensional dependency $y=f_2(x_1)$ in axis $(y,x_1)$, and so on; see FIG. 1A;
For example, for function $$y=\sin(x_1)+\cos(x_2)+\log(x_3)$$

assigned variables are $x_2=0.2$; $x_3=1$; so $y=\sin(x_1)+a$, where $a=\cos(0.2)+\log(1)=0.980$; As a result one-dimensional function $y=0.980+\sin(x_1)$ is drawn. After that parameter $x_2=0.3$, $a=\cos(0.3)+\log(1)=0.955$, $y=0.955+\sin(x_1)$ is drawn, and so on; see FIG. 1A;

2. Assign constant values to all independent variables except for two: $x_k$ and $x_l$, and draw a contour in axes $(x_k, x_l)$ for $f_{kl}(x_k, x_l)=Y_1$, than for $f_{kl}(x_k, x_l)=Y_2$, and so on. As result a contour for every level $Y_1, Y_2, \ldots$; is created. See FIG. 1B. For example, for the same function (1) all points $(x_1,x_2)$ needed to be drawn belong to the solution of following equation:

$$\sin(x_1)+\cos(c_2)+b=Y_1,$$

where $b=\log(c_3)$;
Solving any additional problem for this approach brings up a necessity to use special analytical or numerical methods to determine all points $(x_k, x_l)$ that belong to the equation.

The major difficulty with the above described method of graphical visualization is that it does not permit one to visualize the function's behavior in the entire multidimensional domain of function determination. Usually only the two-dimensional cuts of the function can be seen, and the graphical image depends on the constant values being used to determine the cuts. Typically, there is no simple systematic way (except complex mathematical or numerical analysis) to determine the constants' values allowed to see graphically the most interesting effects of the function's behavior. Therefore, the most important information is often lost and the complete picture can never be seen.

In other words the prior art permits one to graphically analyze functions with just one or two arguments. If a function depended on three or more arguments, the number of independent variables would need to be reduced. That is the reason why it is necessary to assign a constant value for all variables except for two. This is a strong constraint of graphical visualization.

In an actual situation a researcher may need to analyze graphically several multidimensional functions at the same time. The amount of dimension summarization of such a visualization task is much higher than for just one function. Therefore, the existing methods become even less effective.

SUMMARY OF THE INVENTION

A method of visualization and graphical analysis of functions considered in a multi-dimensional domain is provided. The principal approach is to approximate a function (or plurality of functions) by a dataset created by values of the function(s) in the points of a uniformly distributed sequence, and analyze the dataset graphically by dividing the dataset in two or more non-intersecting subsets via split-criteria and drawing each subset in a distinct color on plurality of two- and three-dimensional projections.

In accordance with the present invention, a data analysis system and method are provided that substantially eliminate or reduce disadvantages of previously developed data analysis tools.

Accordingly, this invention provides an interactive method of graphical analysis for a function (or a system of functions) considered in a multidimensional domain. The method is based on the approximation of the function by its values on the points of a uniformly distributed sequence and further graphical analysis of the dataset. In this way the function can be analyzed on the entire multidimensional domain without the necessity to artificially reduce dimension of the domain by assigning constant values to some of the function's parameters. In other words, instead of using two- or three-dimensional cuts (with no information between them) we can use two- or three-dimensional projections of n-dimensional domain without losing any information. Usage of several charts in the interactive mode is sufficient, because it allows one to find a combination of axes for every particular chart that visualize the functions' behavior as a pattern.

Another object of the invention is to provide new methods of graphical analysis by introducing split-criteria dividing the approximating dataset into two or more subsets and to color points of each subset differently, thus making a specific function's behavior visible graphically. It is possible to create an unlimited number of different split-criteria, and each one will generate a new method of graphical analysis.

Still further objects and advantages will become apparent from a consideration of the ensuing description and accompanying drawings.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF THE PREFERRED EMBODIMENT

The inventive method of graphical analysis for multidimensional functions comprises at least these three steps:

1. Generate Uniformly Distributed Sequence (UDS) of points in the multi-dimensional domain;

2. Calculate values of the function (or the system of functions) in the points of the UDS, and create in such way the approximation of the functions by a discrete dataset;

3. Split the dataset into two or more subsets by a selected criteria and draw their projections onto several two- or three-dimensional charts coloring each subset in its own color. At this point a large variety of graphical analysis methods can be created by introduction of different split-criteria.

Figure 4:
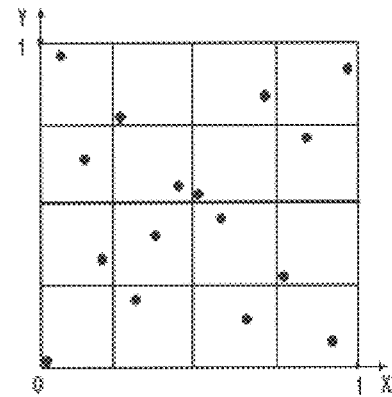
FIG. 4 shows a sample of improved net for n=2 (N=16)
Figure 5:
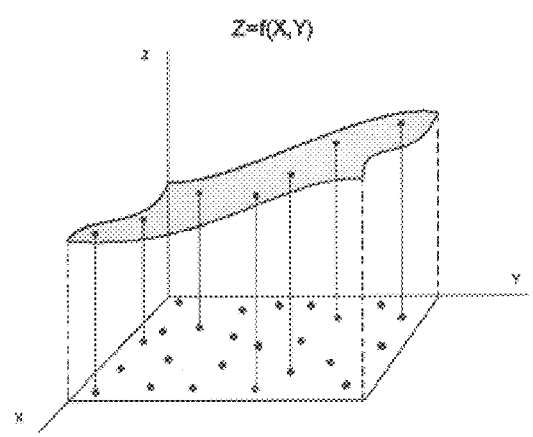
FIG. 5 illustrates the process of calculation f(X,Y) values in the points of uniformly distributed series (UDS)
Figure 6:
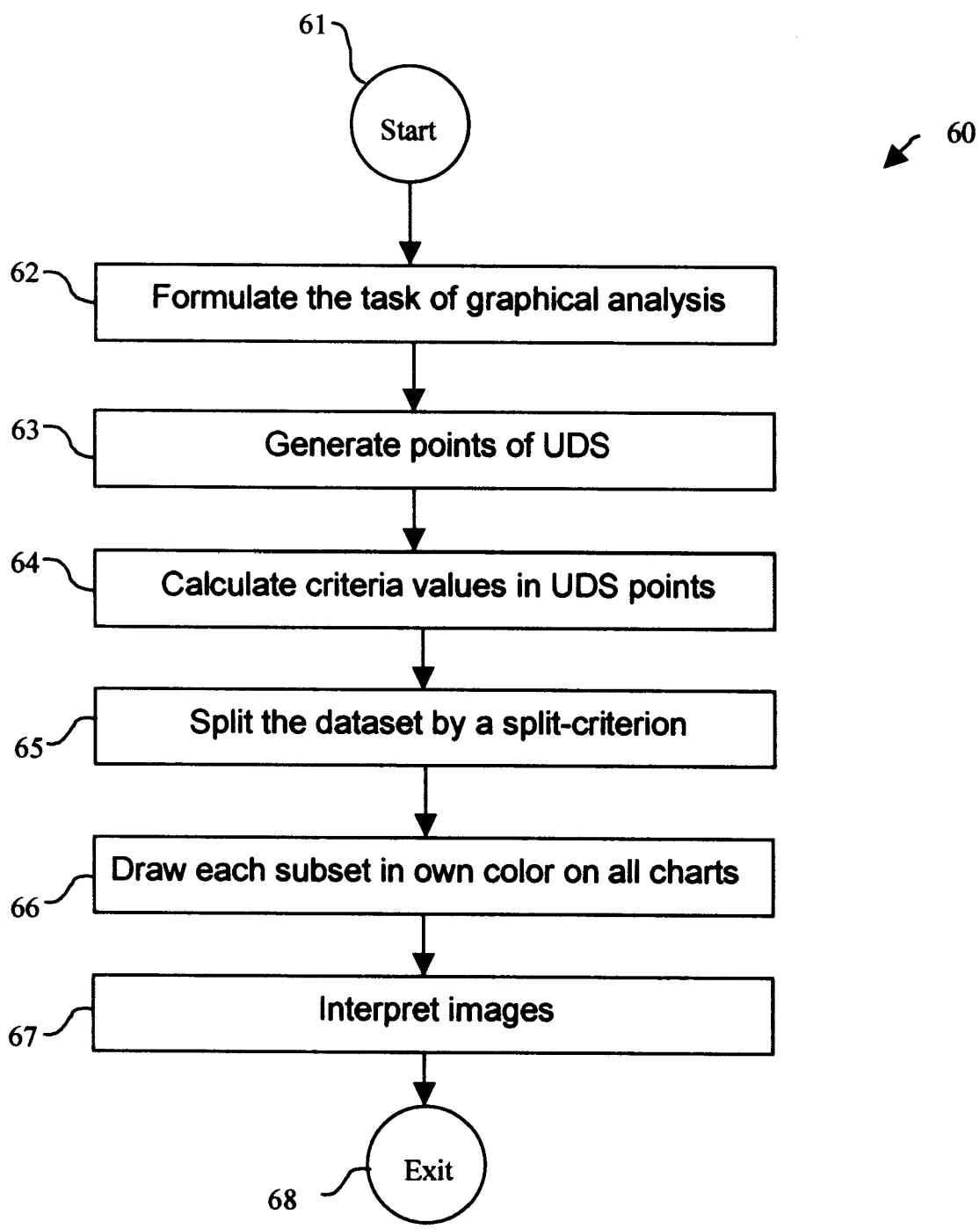
FIG. 6 is a flowchart of graphical analysis operations.

Consider a sequence of operations in detail:

Common part:

a) Formulate the task of graphical analysis: models Y=F(X), where Y=$\{y_1, \ldots, y_k\}$, X=$\{x_1, \ldots, x_n\}$, n—number of independent variables, k—number of dependent variables; m=n+k;

b) Determine minimum and maximum value for every independent variable. In other words—determine the parallelepiped $\Pi$ in the independent variables' space which is supposed to be covered by UDS points;

c) Determine number of UDS points N; Generate UDS points in the parallelepiped $\Pi$ (see example on FIG. 4 for a function Z=F(X,Y));

d) Calculate values of all dependent variables using models Y=F(X) in every point of UDS. As a result a discrete dataset D is generated, which approximates models Y=F(X); (see example on FIG. 5 for a function Z=F(X,Y));

e) Determine a criterion K to split the dataset D to two or more subsets;
f) Apply criterion K to split the dataset D to two or more subsets: $D=d_1, \ldots, d_s$;
g) Each subset should be given a specific color. Points of each subset will be shown in their own (given) color on all charts;
h) Create several two- or three-dimensional charts, and try different axes combination on the charts in the interactive mode in order to find the combination with the most apparent and meaningful pattern;

Analyze the created images, compare them with images on the other charts, and formulate conclusions about the internal dependencies existing in the objective of the research.

A specific part of every kind of graphical analysis is the criterion K that is used to split the entire dataset to two or more subsets (split-criterion) it is possible to form as many different kinds of graphical analysis as many different criteria will be utilized to split the dataset to subsets.

Discussed below are the following split-criteria:

Area of interest criterion $K_A$;
Contour criterion $K_C$;
Criteria constraints' criterion $K_\varphi$;
Functional constraints' criterion $K_F$;
Pareto-set criterion $K_P$.

Present are the n independent and k dependent variables: m=n+k. Generally speaking, there are $C_m^2$ different charts (different combinations for 2 of m variables; $C_m^2=m!/(2*(m-2)!)$).

For example, for m=20 it is possible to create $20!/(2*18!)=190$ different charts to see all possible combinations of axes. But it is enough to just have m/2=10 two-dimensional or m/3=7 three-dimensional charts to see all of the projections of the dataset at the same time in a particular combination of variables.

The importance of step h) is now even more evident: There is no need to see 190 charts at the same time since it is hard to do technically, and usually just a small number of them are of real interest to the user. However, it is essential to find the best ones, and it is easy to do in interactive mode.

The most important question in understanding of the invented method of graphical analysis is: "Why should we use Uniformly Distributed Sequences?"

The answer to that question has been described in detail in *'Multicriteria Optimization and Engineering'*, R. Statnikov et al., An International Thompson Publishing Company, (1995) which is herein incorporated by reference.

For many of applied problems the following situation is typical. There exists a multidimensional domain in which a function (or a system of functions) is considered and whose values may be calculated at a certain points. Suppose the user needs to obtain some information on the behavior of the function in the entire domain or in any sub domain. Then, in the absence of any additional information about the function, it is natural to wish that the points at which the function is calculated would be uniformly distributed within the domain. However, the question arises: What meaning should be assigned to the notion of uniform distribution? This concept is quite evident only in the case of a single variable. By dividing the range of the variable into N equal parts and locating a point within each of the parts, a sequence of N points (a net) uniformly distributed over the domain under consideration is produced. Unfortunately, in the case of several variables, the concept of uniformity is not so evident. If for each of the variables a partition is similar to the case of a single variable, then for n variables the result is the production of $N^n$ points (a cubic net). However, the concept of uniformity should be independent of the number of points, and, besides, the use of nets containing so many points seriously complicates the solution of practical tasks.

Assume a function of one variable $s=F(x)$, and the task is to research behavior of the function in the interval $x \in [a, b]$. The most obvious way to accomplish that is to use UDS and calculate values of the function $F(x)$ in the points of the sequence.

How to build UDS for the interval [a, b]?

Figure 1A:
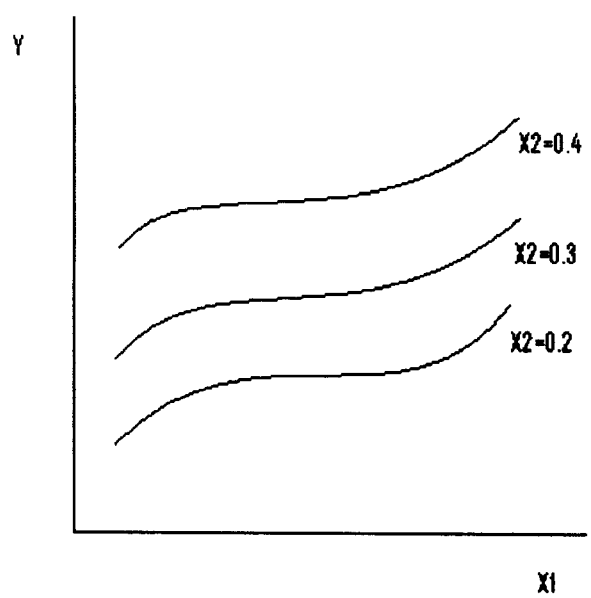
FIGS. 1A and 1B show two prior art visualization methods for a function Y=f(X1,X2)
Figure 1B:
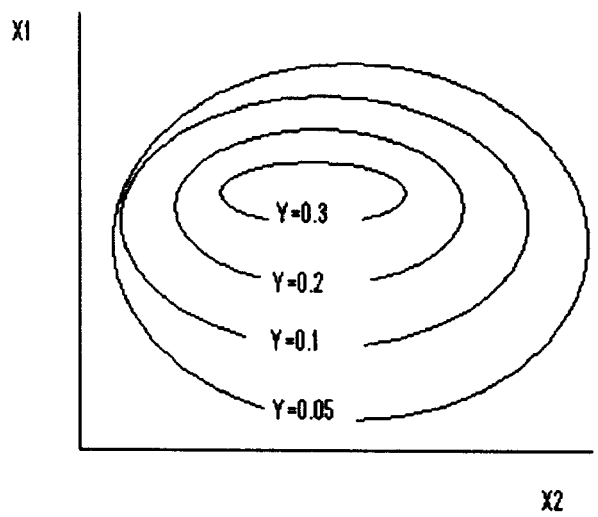
Figure 2:
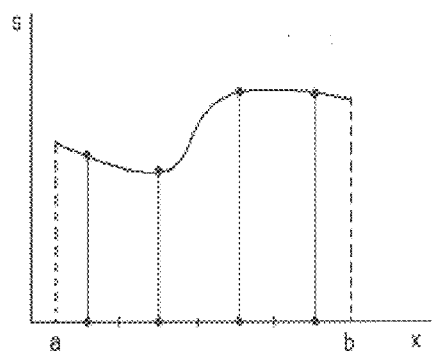
FIG. 2 shows a one-dimensional net (n=1) with 4 points (N=4)

1. Split interval [a, b] onto N equal subintervals (see FIG. 2 with N=4) and pick a point in the middle of each subinterval. Now it is possible to calculate $s=F(x)$ for every point and see the behavior of the function.

For functions with more than one independent variable the solution is not so obvious. Assume a sample function of two variables $Z=f(x, y)$.

Figure 3:
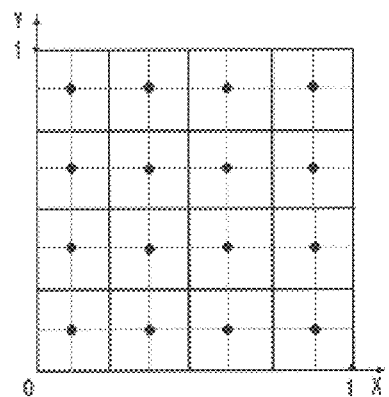
FIG. 3 shows a two-dimensional, or cubic net for n=2 (N=16)

Using the same idea as in the previous sample, one starts by splitting every interval into equal subintervals and picks a point in the center of determined in such way squares. (see FIG. 3 with number of intervals equal to N=4 and number of independent variables equal to n=2). The name of the UDS built in such way is cubic net.

If function $Z=f(x, y)$ strongly depends from one of the two variables and does not depend (or almost does not depend) from another variable then the result is just 4 different function values despite 16 calculated points. In case of improved UDS there are still 16 different values, because it always has as many projections on any axis as many points we have generated, and those projections are also UDS.

From this moment on, the abbreviation UDS will be used for improved UDS. The above described type of UDS will be named a cubic net.

In the case of a larger number of independent variables, the advantage of UDS becomes much more evident. For instance, for 10 variables and 4 intervals the task is to calculate the function values in $4^{10}=1,048,576$ points of cubic net. If the function truly depends from 5 of 10 variables (which is a very common situation in any research) then utilization of the cubic net will give us just $4^5=1,024$ different function values of 1,048,576 points! However, utilization of UDS will result in the same 1,048,576 different function values, or 1,048,576/1,024=1,024 times more information.

Previous samples are sufficiently simplified to make the estimations more readable. Real tasks very often have 20–50 independent and 10–20 dependent variables. In addition, the division of intervals to 4 subintervals obviously won't provide any useful accuracy. It is essential to have hundreds and thousands of points projections on every axis. Therefore, utilization of cubic net becomes impossible in any real task because the number of required points will be astronomic:

10 variables and 100 subintervals: $100^{10}=10^{20}$ 30 variables and 1000 subintervals: $1000^{30}=10^{90}$ Thus, it is clear now that utilization of UDS solves a fundamental problem of functions' graphical analysis.

All sample images shown in the accompanying drawings use uniformly distributed sequences calculated using the following algorithm.

If in binary notation the number of point i is represented as $i=e_m \ldots e_1$, all coordinates of the point $Q_i=(q_{i,1}, \ldots, q_{i,n})$ are to be calculated using the same formula $$q_{i,j}=e_1 V_j^{(1)} * e_2 V_j^{(2)} * \ldots * e_m V_j^{(m)}, j=1, \ldots, n \quad (1)$$

where * denotes a digit-by-digit modulo two addition in binary notation. It is discussed in in greater detail.

Generally speaking, a sequence of random numbers can be used for approximation of a multi-dimensional function instead of UDS. This approach allows getting similar results of visualization and graphical analysis. But quality of approximation based on random number sequence will be very poor. As result, quality of visualization will be lower than with UDS.

Area of Interest Graphical Analysis

Figure 7:
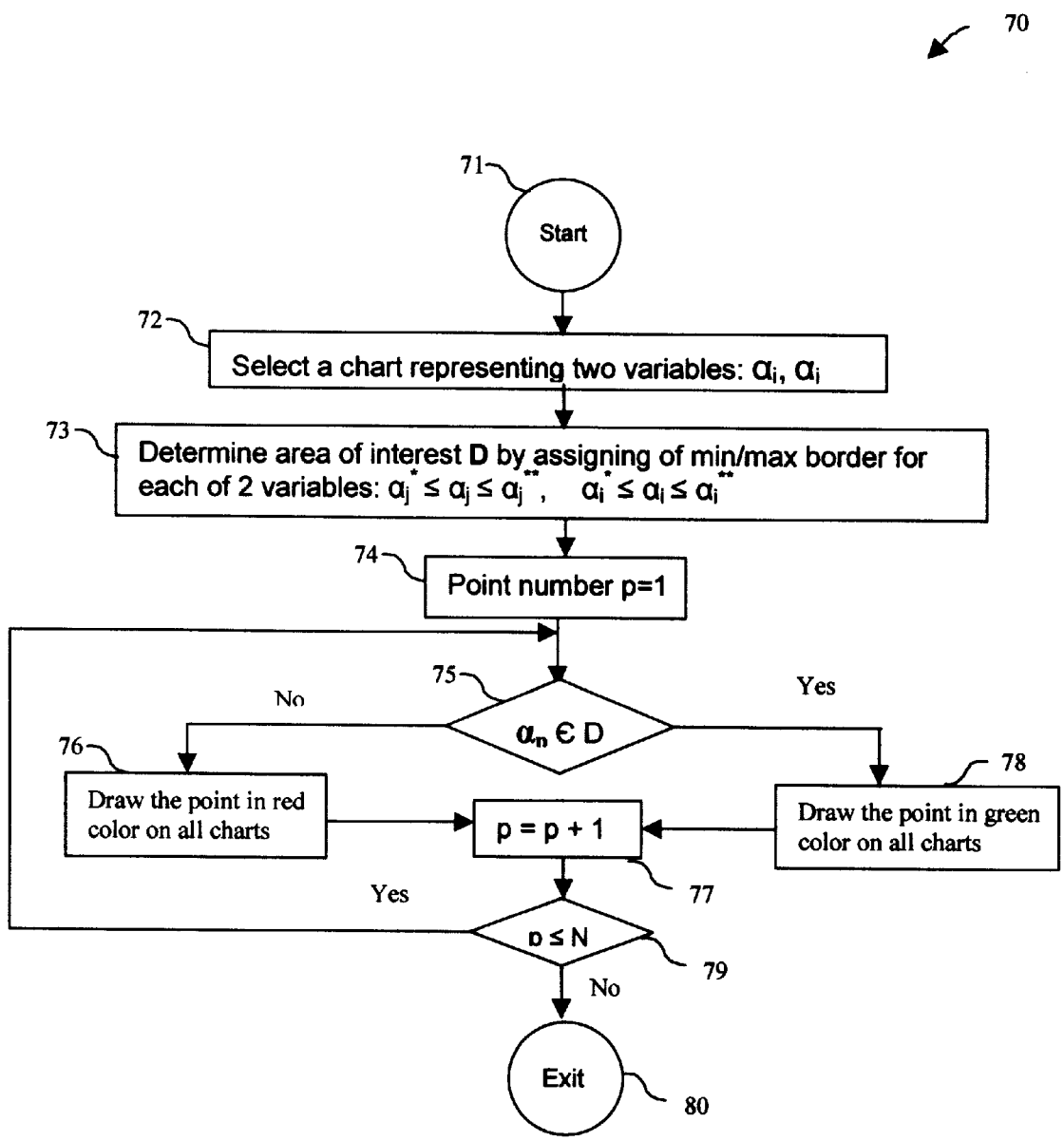
FIG. 7 is a flowchart for "Area of Interest" method of graphical analysis.

FIG. 7 is a flowchart for "Area of Interest" method of graphical analysis. FIG. 7 shows the sequencing of steps to perform the "Area of Interest" method of graphical analysis. Area of interest on the FIG. 7 is determined as a rectangle built on two variables. In this case the minimum and maximum values are determined for each of the two selected variables. All points inside of the rectangle will be colored in green color on all charts. The rest of the points will be shown in red color.

When n independent and k dependent variables are present m=n+k. The next step is to apply the split-criterion in a variety of different ways in solving a task. The main idea of the "Area of Interest" method is to select an area on p<m projections, color internal points in their own (green) color, external points in their own (red) color, and see a pattern of green points on other (m–p) projections.

Figure 8A:
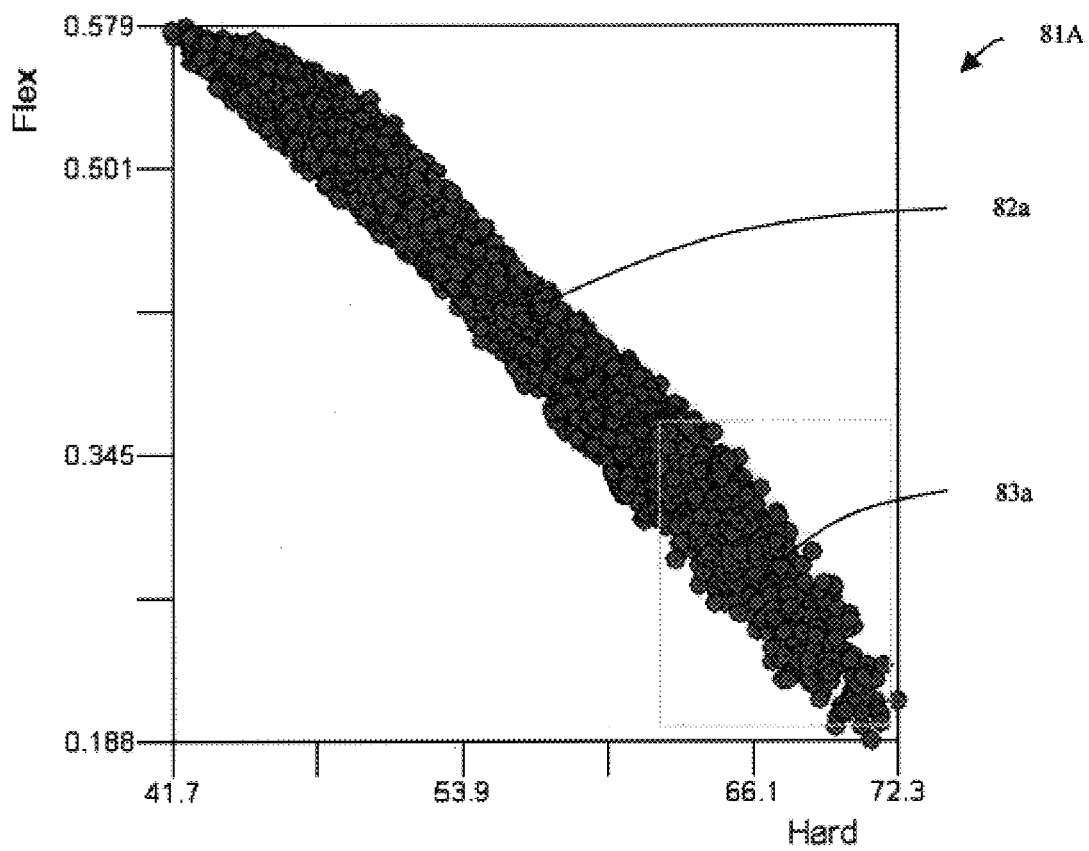
FIG. 8A shows an area of interest (green color, 83a) selected by movable and resizable rectangle in axes of dependent variables Flexibility-Hardness (rubber mechanical properties in the sample)
Figure 8B:
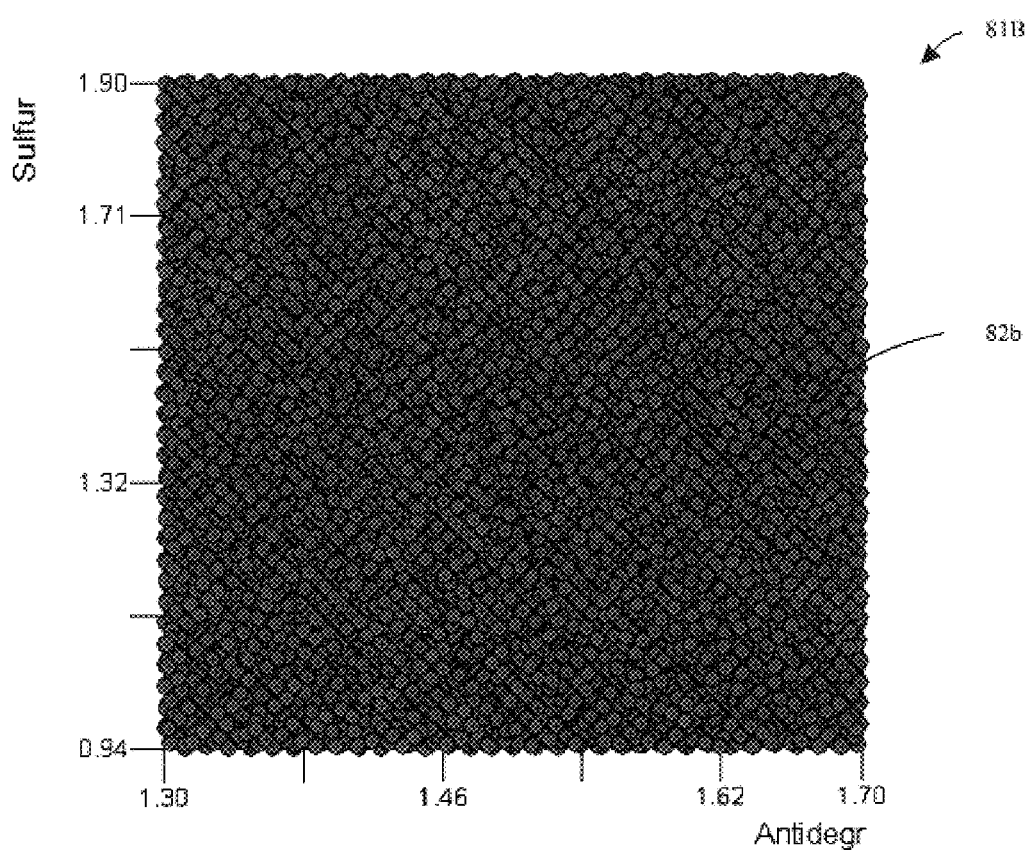
FIG. 8B shows the corresponding points (green color, 82b) in axes of independent variables Sulfur-Antidegradant (concentration of rubber ingredients in the sample)
Figure 8C:
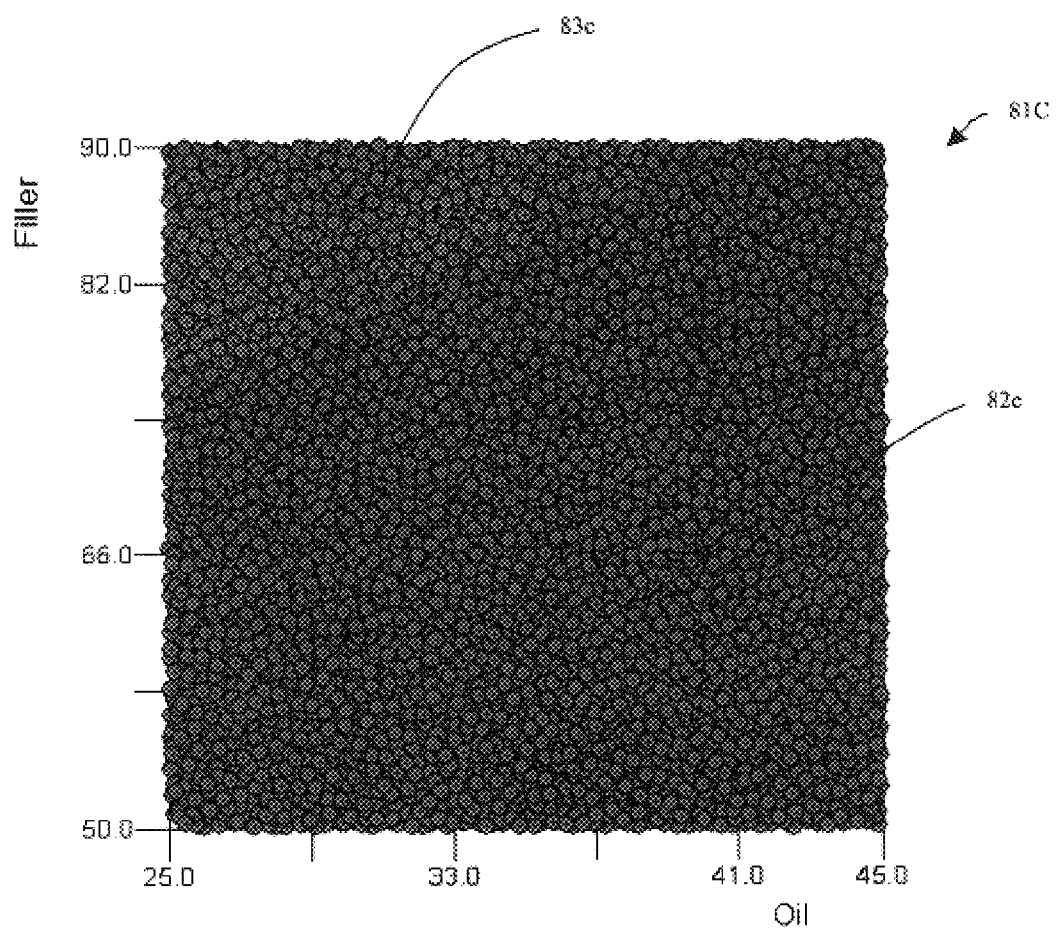
FIG. 8C shows the corresponding points (green color, 83c) in axes of independent variables Oil-Filler (concentration of rubber ingredients in the sample)
Figure 8D:
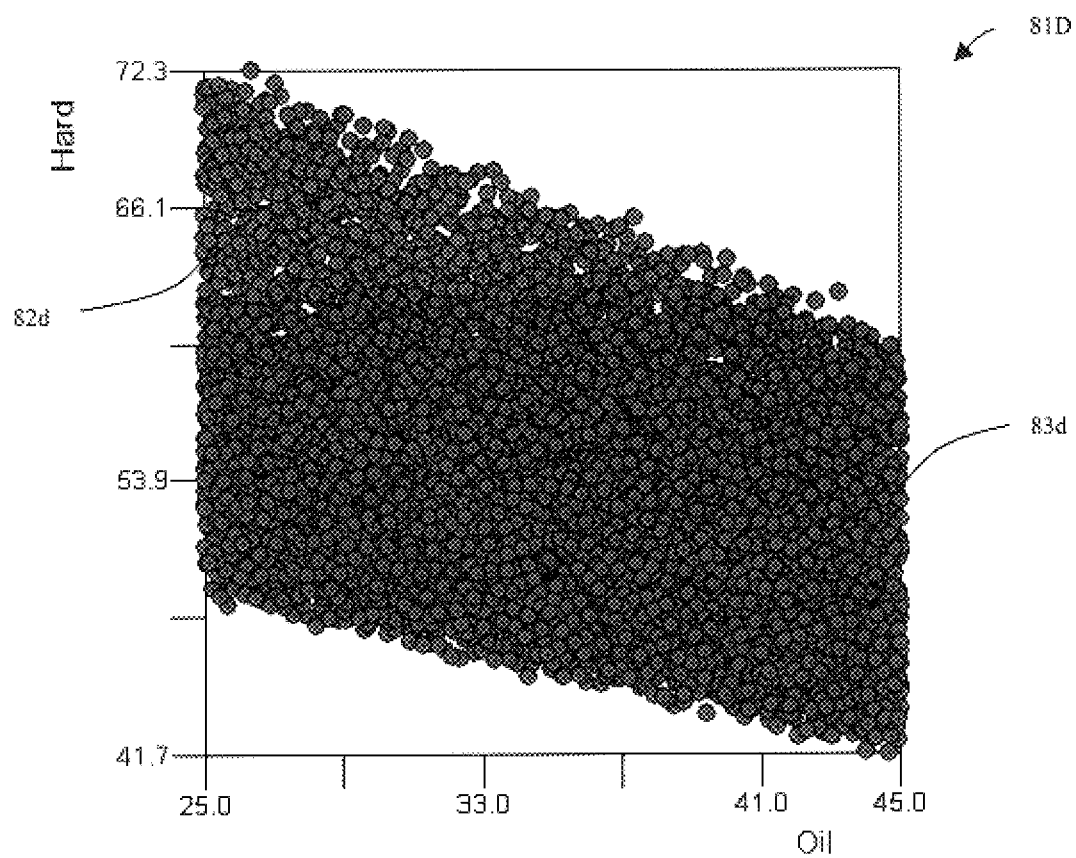
FIGS. 8D, 8E and 8F show an area of interest configuration in different axes (combination of dependent and independent variables)
Figure 8E:
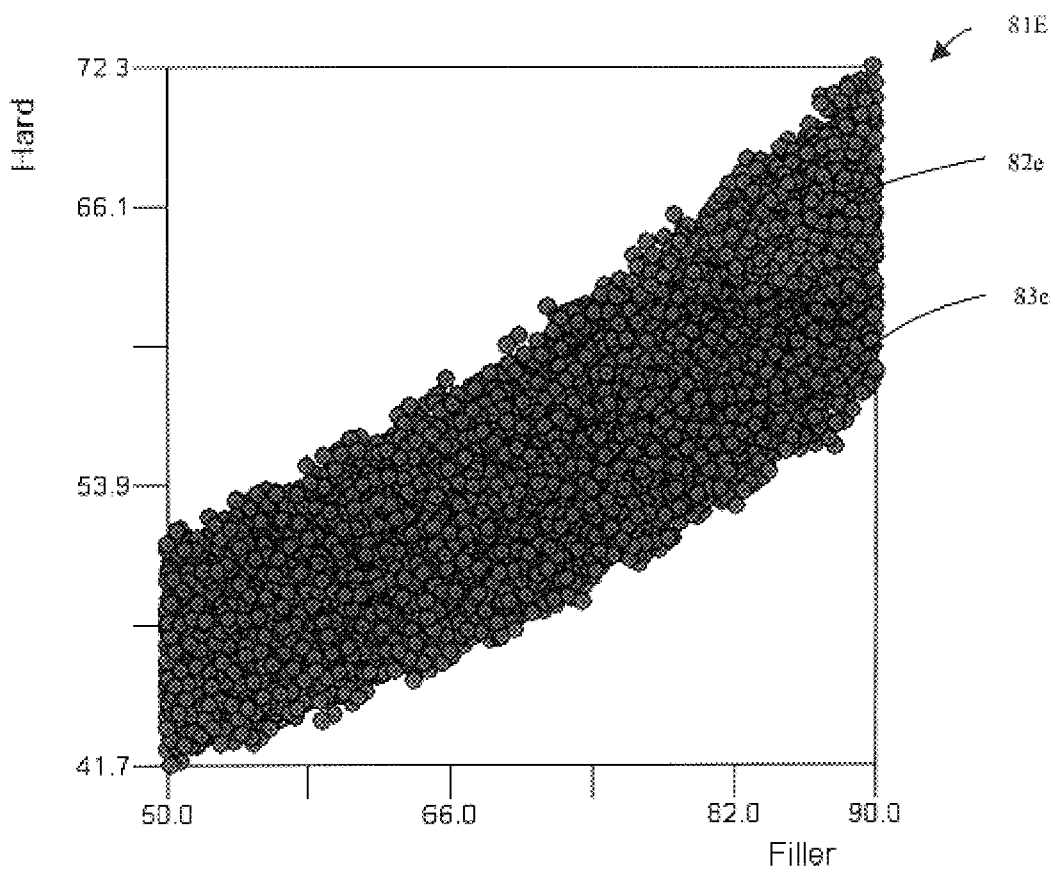
Figure 8F:
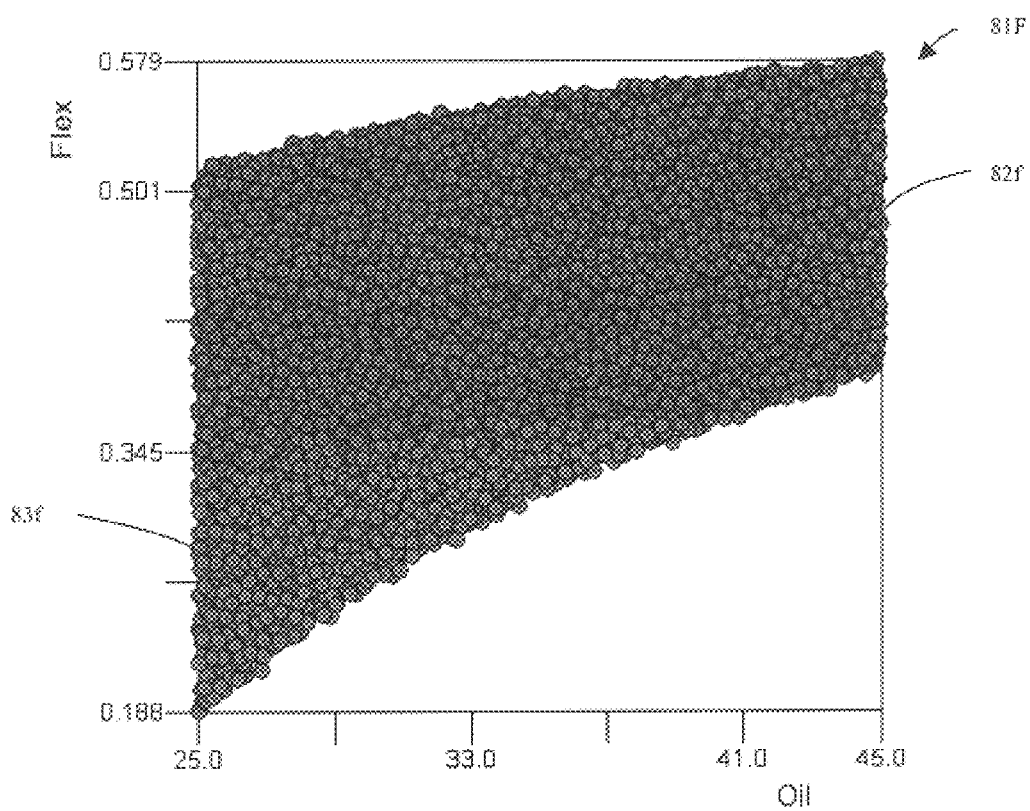

To clarify, we observe the selected area. For instance (see FIGS. 8A–8C), the selected area of acceptable values 83$a$ for hardness and flexibility of rubber and notice the pattern of ingredients' concentrations 83$c$ in axes Filler-Oil, delivering such properties. The chart with axes Sulfur-Antidegradant (81B) does not show any pattern. Thus, it is correct to conclude that hardness and flexibility depend on concentration of Filler and Oil, but do not depend significantly on Sulfur and Antidegradant.

If a user selects an area of interest in the space of independent variables, it will make it possible to observe a pattern of appropriate values in the space of dependent variables. Similarly, a user can utilize a mixture of dependent and independent variables to select an area of interest if it is useful from a practical point of view (see 81D, 81E, 81F).

Utilization of different dimensions p<m for the area of interest (p=1; p=2; p=3, . . . ) also provides a variety of meaningful patterns with valuable practical issues. It attempts to answer for example the following questions: What is the pattern in the ingredients' concentration space for the flexibility range $(F_1, F_2)$?; What is the pattern in the ingredients' concentration space for the flexibility range $(F_1, F_2)$ and hardness range $(H_1, H_2)$?

Area of interest split-criterion can be not only a multi-dimensional parallelepiped, but also a two- or multi-dimensional sphere where we need to determine center as k-dimensional vector (k<N), and radius of the sphere.

Parallelepiped and sphere are the simplest possible figures that can be used as split-criteria. Those criteria are an easy and convenient way for solving most of the practical graphical analysis tasks because of their simplicity in implementation and interactive nature, but it is not the only possible way of using those split-criteria. Any equations or other rules determining multidimensional sub domains can be used to separate a subset of points.

The number of possible ways to use "Area of Interest" split-criterion is so large that we need to use only suitable ones to obtain answers for practical or scientific questions. Interactive mode is the most effective for solving such tasks, because we can easily change size and dimension of the area of interest.

Contour Graphical Analysis

Figure 9:
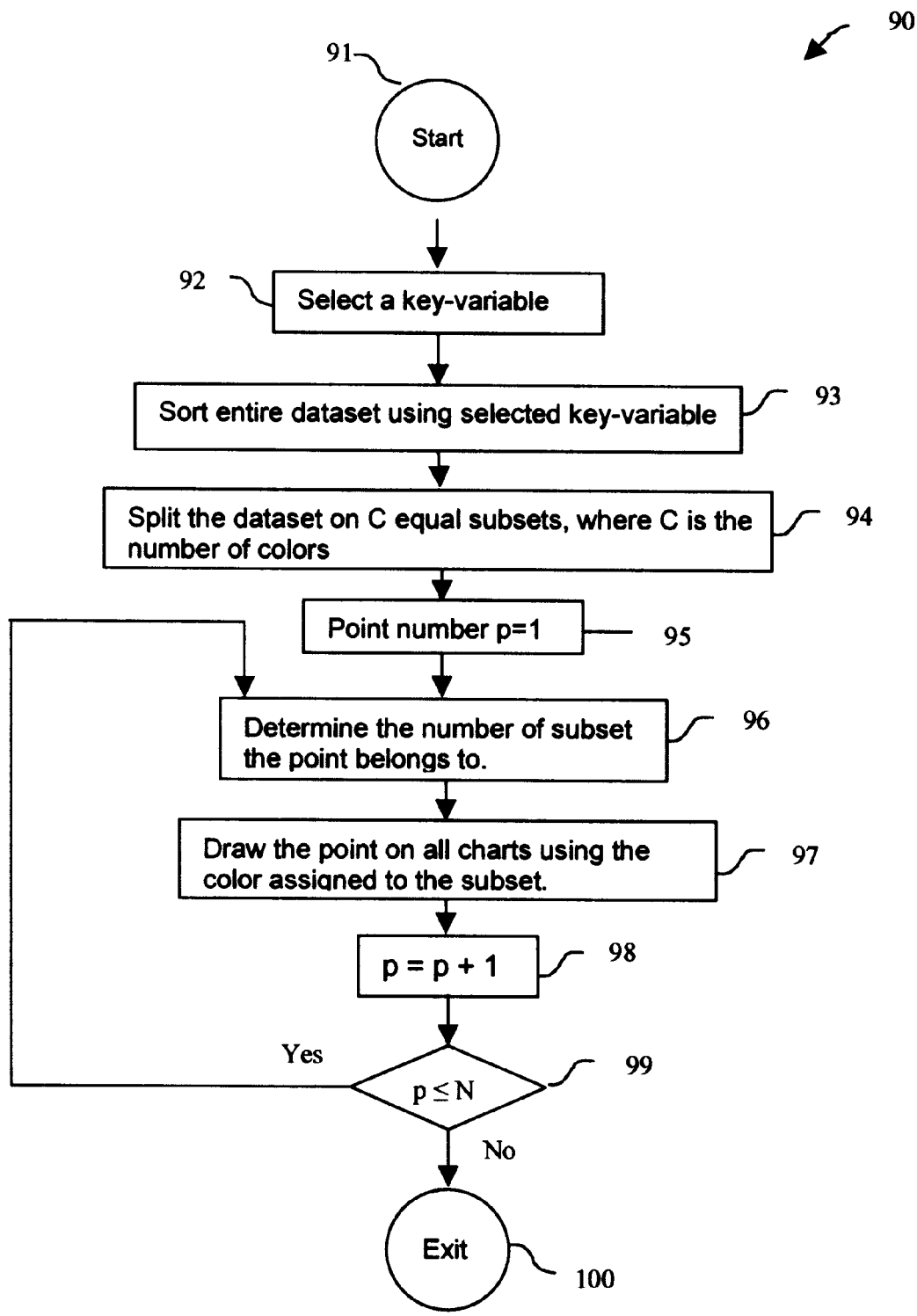
FIG. 9 is a flowchart for "Contour" graphical analysis.

FIG. 9 is a flowchart for "Contour" method of graphical analysis. FIG. 9 shows the sequence of steps to perform "Contour" method of graphical analysis.

Assume that the first step of graphical analysis was performed—approximation of multi-dimensional surface by a discrete dataset. So, we have N m-dimensional points (m=n+k, where n—the number of independent variables, and k—the number of dependent variables).

Now we can start graphical analysis using $K_C$ split-criterion (for contours):

1. Select a key-variable, which will be used as a key to build contour images;
2. Sort the entire dataset in ascending order using selected key-variable;
3. Split the dataset on C equal subsets with the same number of points, where C is the number of colors we are going to use on contour images; assign own color for each subset;
4. Redraw all charts using appropriate color for each data subset (see a sample at FIGS. 10A–10F using 6 colors);
5. Analyze the patterns and make your conclusions;
6. Change the key-variable in interactive mode and go to a).

Figure 10A:
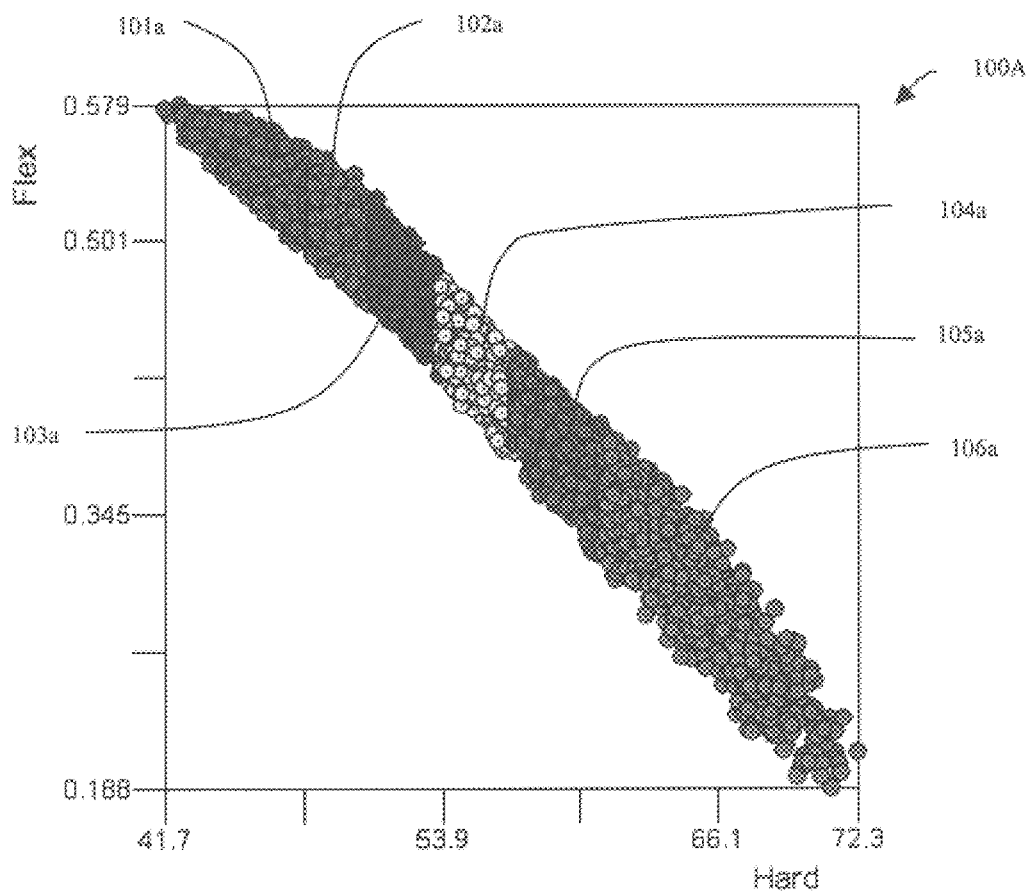
FIGS. 10A, 10B and 10C are a result of "Contour" graphical analysis with key-variable Flex using 6 colors: light-blue for the subset with the largest values of the key-variable; magenta for the smaller values; then yellow, blue, green, and red for the last dataset with the smallest values of the key-variable.
Figure 10B:
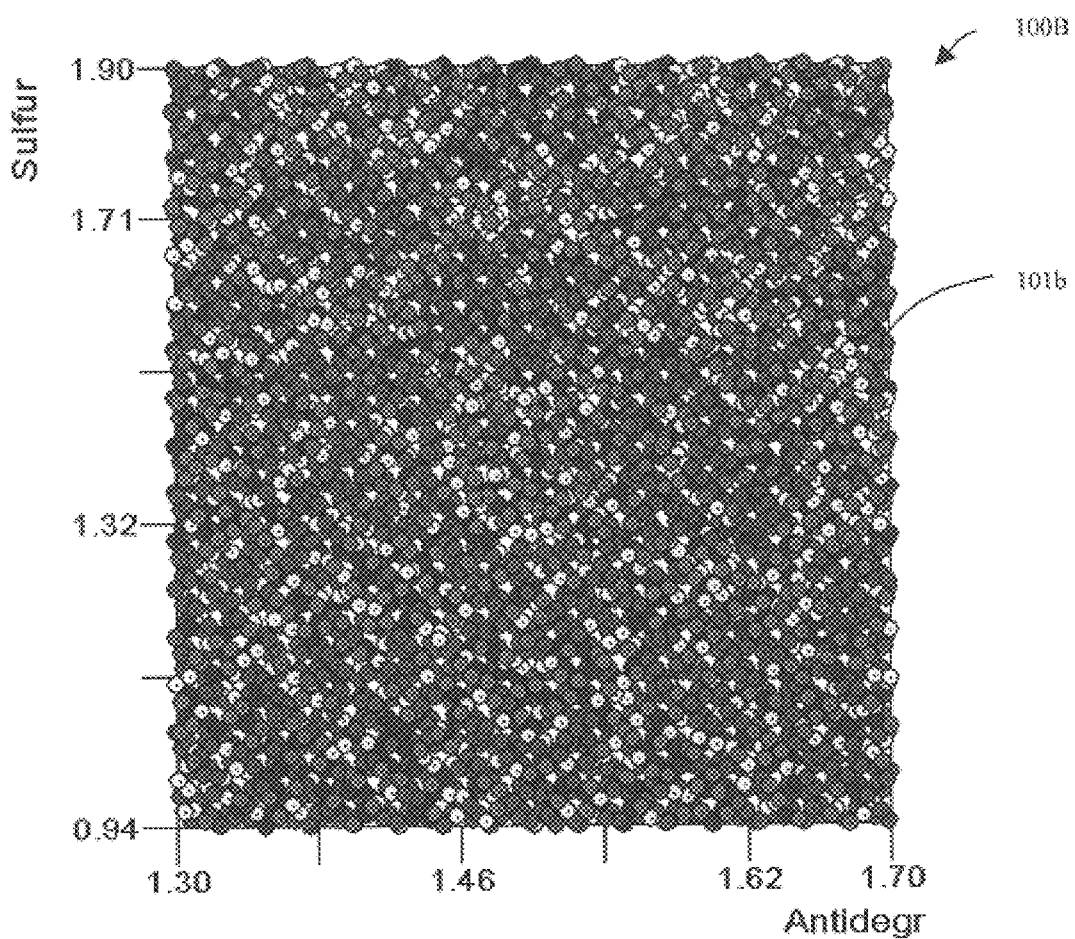
Figure 10C:
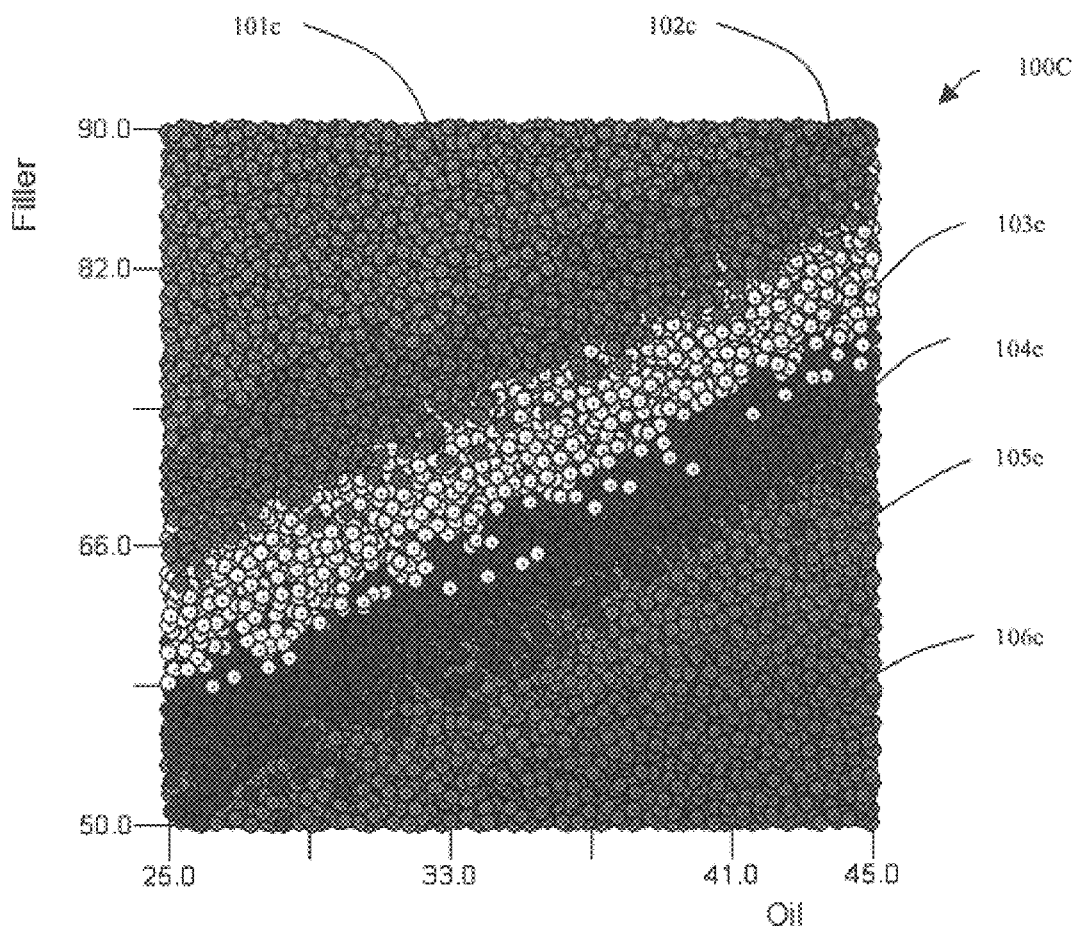
Figure 10D:
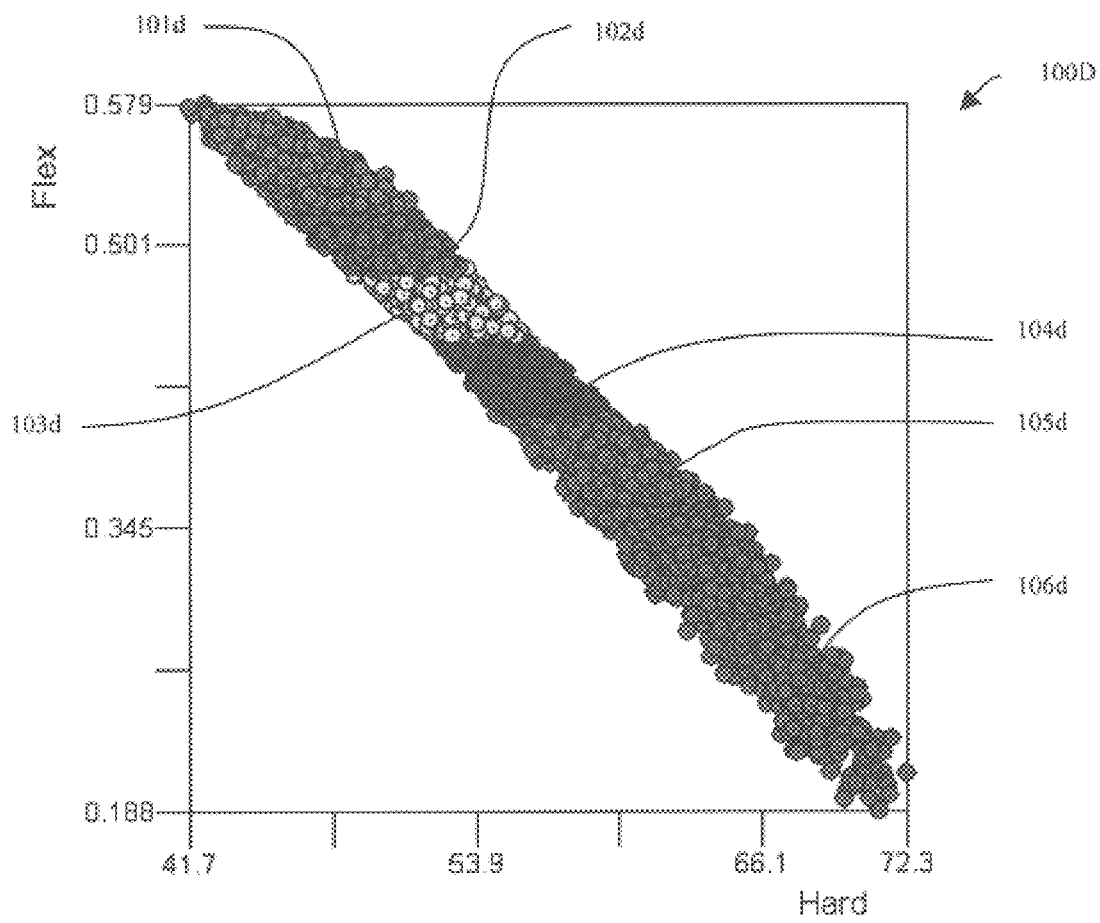
FIGS. 10D, 10E and 10F are a result of "Contour" graphical analysis with key-variable Hard using 6 colors: light-blue for the subset with the largest values of the key-variable, magenta for the smaller values, then yellow, blue, green, and red for the last dataset with the smallest values of the key-variable.
Figure 10E:
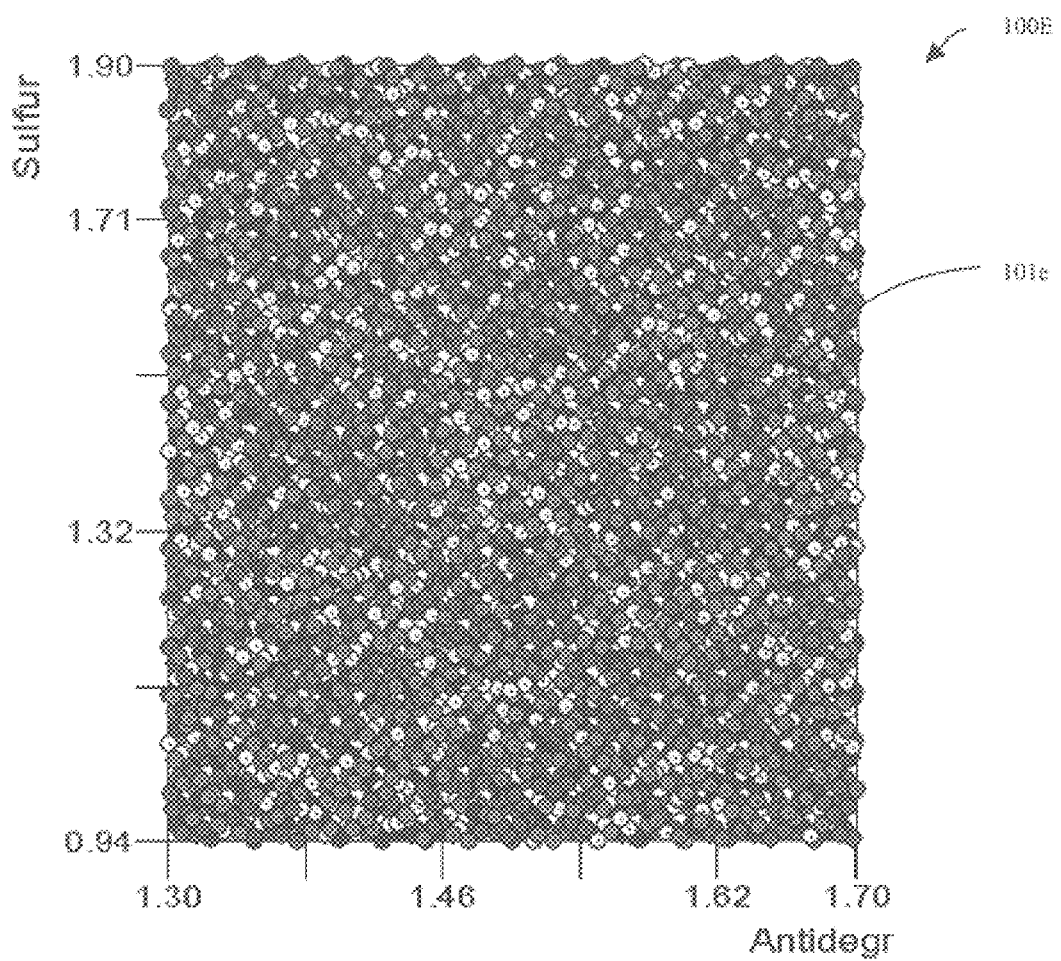
Figure 10F:
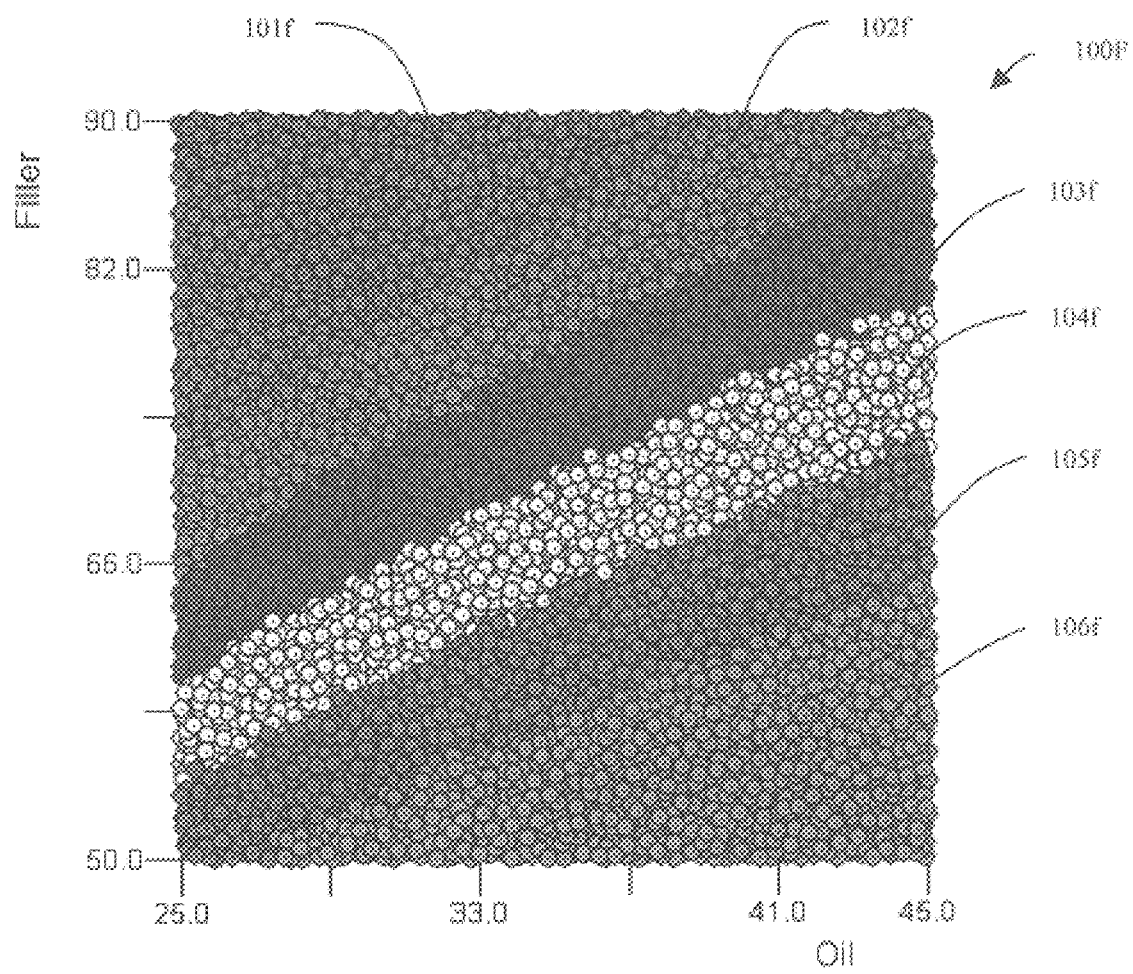

For example (see FIGS. 10A–10C), we use Flex as a key-variable and perform Contour graphical analysis (see 6 colors on FIG. 10A: red 101$a$, green 102$a$, blue 103$a$, yellow 104$a$, magenta 105$a$, light-blue 106$a$). Now we can see a pattern of the same colors on the chart 100C with axes Filler-Oil (light-blue 101$c$, magenta 102$c$, yellow 103$c$, blue 104$c$, green 105$c$, red 106$c$). Chart 100B with axes Sulfur-Antidegradant does not have any pattern, and we can say that hardness and flexibility depend on Filler and Oil, but do not depend significantly on Sulfur and Antidegradant (similar to Area of Interest graphical analysis).

In another example (see FIGS. 10D–10F) we use Hard (hardness) as a key-variable. On the chart 100F with axes Filler-Oil we see the opposite (comparing with previous example) order of the same 6 colors (red 101$f$, green 102$f$, blue 103$f$, yellow 104$f$, magenta 105$f$, light-blue 106$f$). Therefore, flexibility and hardness significantly depend on Filler and Oil, but the type of dependency is different: Left-upper corner of the chart Filler-Oil is the area of the lowest values of hardness and the highest values of flexibility; right-lower corner of the chart Filler-Oil is the area of the highest values of hardness and the lowest values of flexibility.

We have at least two different variants of contour split-criterion:

1. Split the dataset into C equal subsets with the same number of points; width of sub ranges will be different, but the number of points will remain the same;
2. Divide the range of the key-variable into C equal sub ranges; width of all sub ranges will be the same, but the number of points in each one will be different.

Number of subsets (contours, colors) C is adjustable, and should be correlated with resolution of the graphical device. For the majority of the practical tasks, using 6–8 colors is usually adequate. However, if there is a very high resolution and a big dataset (~1,000,000 or more points) and we wish to see small details, then we should use a larger number of colors.

Multi-Objective Optimization Task

Split-criteria using constraints ($K_C$), functional constraints ($K_F$) and Pareto-set ($K_P$) are closely related to Multi-Objective Optimization task, and use similar terms and ideas. Thus, we need to formulate the task before discussing any of those split-criteria.

Formulation of Multi-Objective Optimization Task is described in detail in Multicriteria *Optimization and Engineering'*, R. Statnikov et al., referred to above.

Consider an object (compound, alloy, mechanical device, biological, social systems, et cetera) whose operation is described by a system of equations (differential, algebraic, et cetera) or whose performance criteria may be directly calculated. We assume that the system depends on n design variables $\alpha_1, \ldots, \alpha_n$ variables representing a point $\alpha=(\alpha_1, \ldots, \alpha_n)$ of an n-dimensional space. Design-variable constraints have the form $$\alpha_j^* \leq \alpha_j \leq \alpha_j^{**}, j=1, \ldots, n; \quad (2)$$

Functional constraints can be written as follows:

$$C_i^* \leq f_i(\alpha) \leq C_i^{**}, i=1, \ldots, t; \quad (3)$$

Where the functional dependencies $f_i(\alpha)$ can be any dependencies whether related or not related to the equations mentioned previously, and $C_i^*$ and $C_i^{**}$ are constraints.

Also, there exist particular performance criteria such as productivity, efficiency, cost, mechanical or electrical properties, et cetera. It is desired that, other things being equal, these criteria denoted by $\phi_\mu(\alpha)$, $\mu=1, \ldots, k$ would have the extreme values. For simplicity we suppose that $\phi_\mu(\alpha)$ are to be minimized.

Obviously, constraints (2) single out a parallelepiped Π in the n-dimensional space of independent variables. In turn, constraints (3) define a certain subset G in Π whose volume may be assumed to be positive without loss of generality.

In order to avoid situations in which the designer regards the values of some criteria as unacceptable, we introduce criteria constraints $$\phi_\mu(\alpha) \leq \phi_\mu^{**}, \mu=1, \ldots, k \quad (4)$$

Where $\phi_\mu^{**}$ is the worst value of criterion $\phi_\mu(\alpha)$ the designer may accept. Constraints (2)–(4) define the feasible solutions set D, i.e. the set of solutions $\alpha^i$ that satisfied the constraints, and hence $D \subset G \subset$. Let us formulate the basic problem of multi-criteria optimization. It is necessary to find such a $P \subset D$ for which $$\phi(P)=\min \phi(\alpha), \alpha \in D \quad (5)$$

Where $\phi(\alpha)=(\phi_1(\alpha), \ldots, \phi_k(\alpha))$ is the criteria vector; and P is the Pareto optimal set.

We mean that $\phi(\alpha)<\phi(\beta)$ if for all $\mu=1, \ldots, k$ $\phi(\alpha) \leq \phi(\beta)$ and at least for one $\mu_0 \in \{1, \ldots, k\}$ $\phi\mu_0(\alpha) \leq \phi\mu_0(\beta)$.

Upon solving the problem, one has to determine design-variable vector $\alpha_0 \in P$, which is the most preferred among the vectors belonging to set P.

It is emphasized that (2)–(5) task's formulation means making decisions about:

Minimum/maximum values for all independent variables: $\alpha_j^* \leq \alpha_j \leq \alpha_j^{**}, j=1, \ldots, n$;

Minimum/maximum values for functional constraints: $C_i^* \leq f_{i(\alpha) \leq Ci}^{**}, i=1, \ldots, t$;

What to do with every particular criterion $\phi_\mu(\alpha), \mu=1, \ldots, k$—to minimize or maximize it;

Constraint value $\phi_\mu^{**}$ for every criterion $\phi_\mu(\alpha)$, $\mu=1, \ldots, k$ (the worst value the designer may accept).

Following types of graphical analysis will use conditions (3)–(5) as split-criteria: Functional Constraints (3), Criteria Constraints (4), and Pareto (5).

Functional Constraints Graphical Analysis

Figure 11:
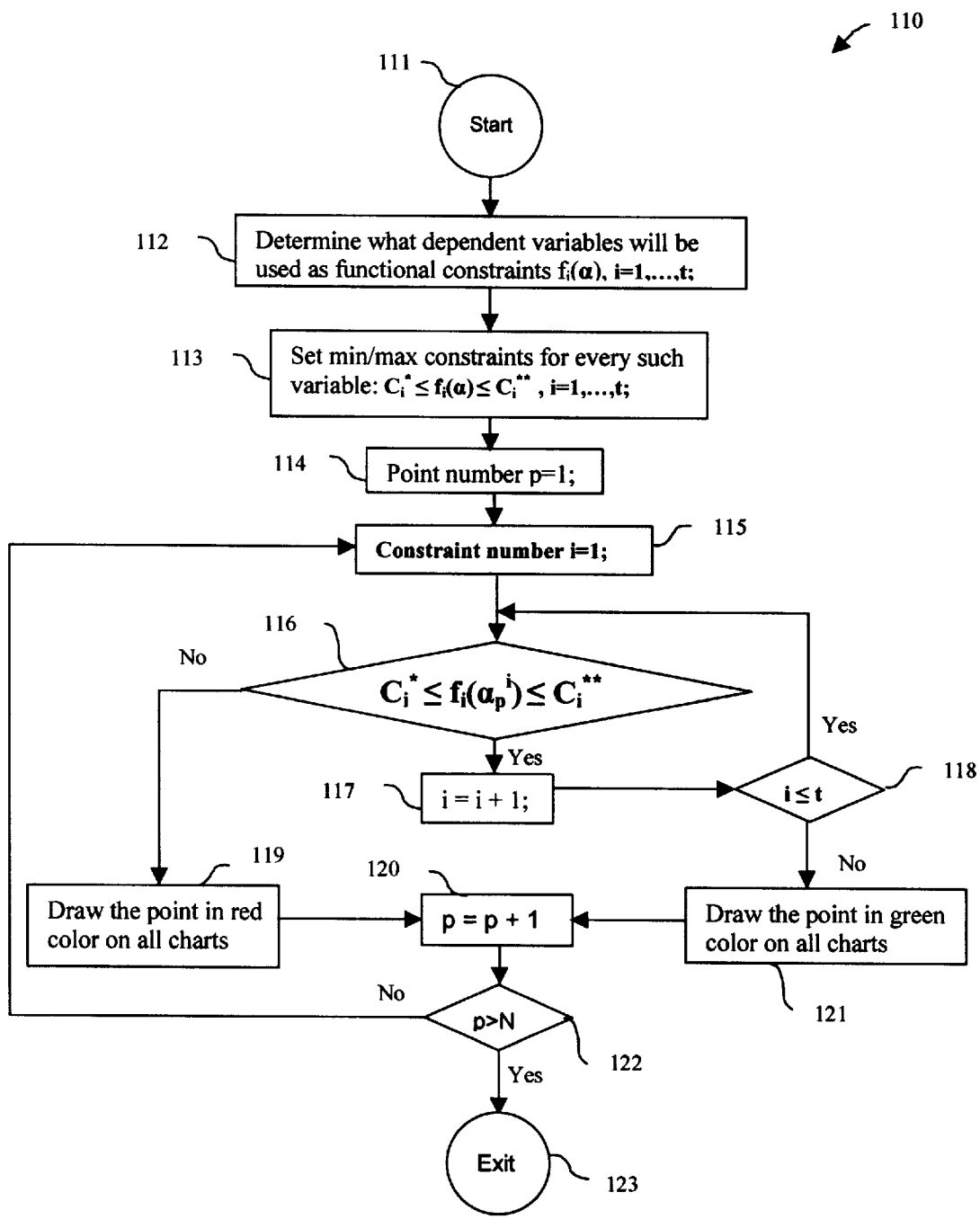
FIG. 11 is a flowchart for "Functional Constraints" method of graphical analysis.

FIG. 11 is a flowchart for "Functional Constraints" method of graphical analysis. FIG. 11 shows the sequence of steps to perform "Functional Constraints" method of graphical analysis.

Let's assume that we have formulated multi-objective optimization task (2)–(5) and have performed the first step of graphical analysis—approximation of multi-dimensional surface by a discrete dataset. Hence, we have a dataset to analyze and, split-criterion in form of $C_i^* \leq f_i(\alpha) \leq C_i^{**}$, i=1, . . . , t to split the dataset into two subsets: I (internal points that match constraints (3), green color) and E (external points that don't match constraints (3), red color).

Figure 12A:
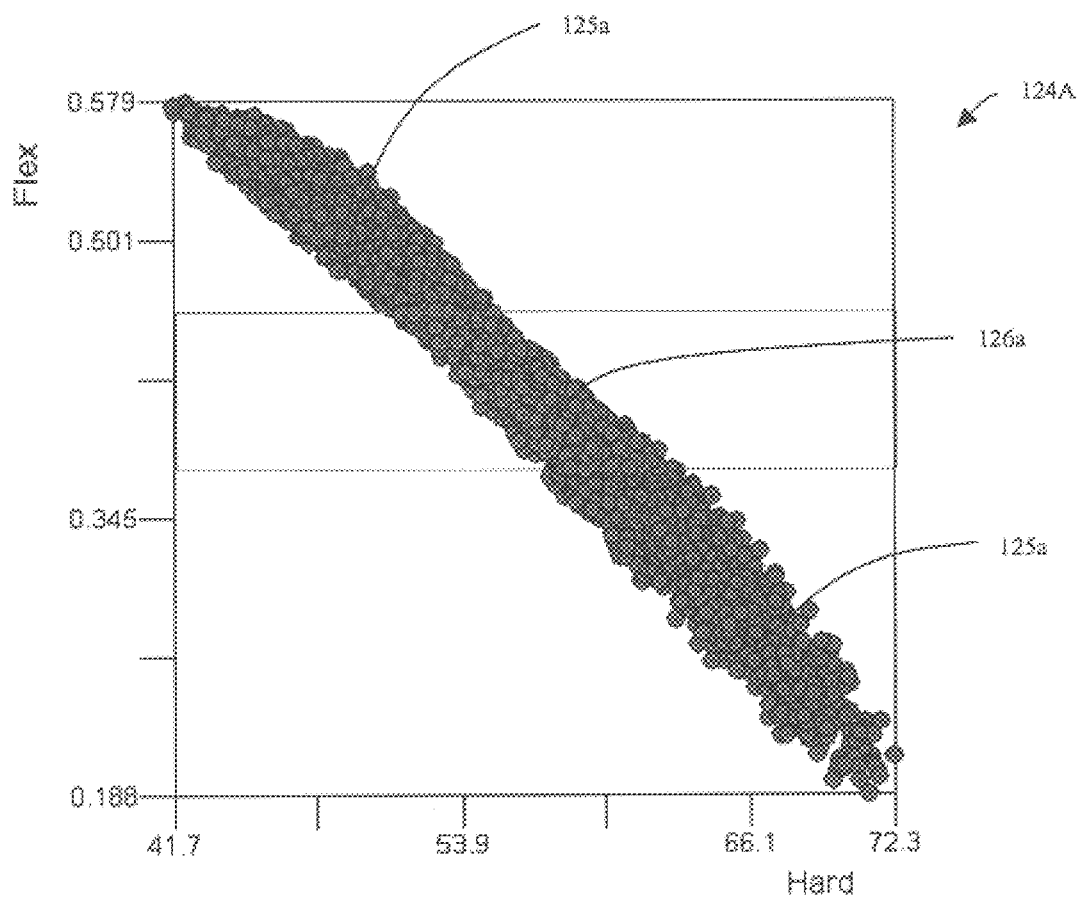
FIG. 12A shows points that match functional constraints for Hardness (green color, 125a) selected by movable and resizable rectangle in the axes of dependent variables Flexibility-Hardness (rubber mechanical properties in the sample)
Figure 12B:
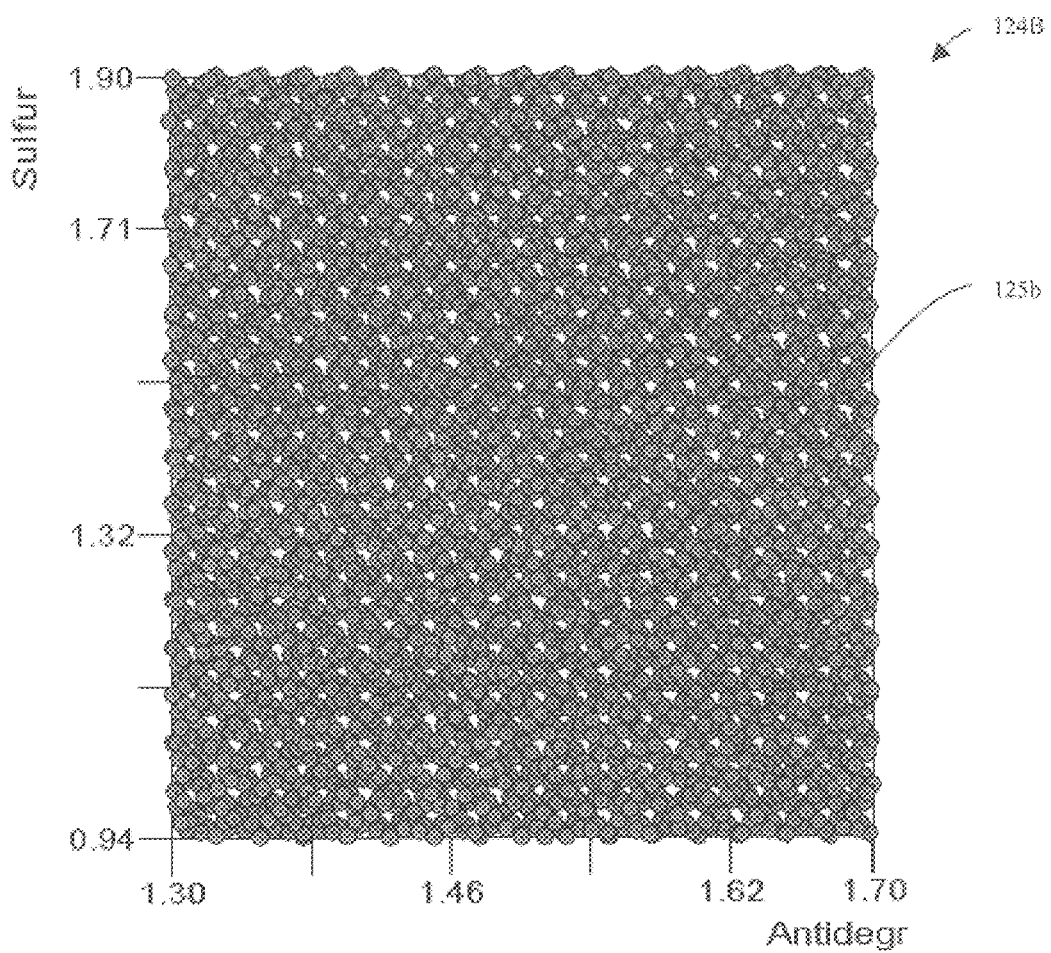
FIG. 12B shows the corresponding points (green color, 125b) in the axes of independent variables Sulfur-Antidegradant (concentration of rubber ingredients in the sample)
Figure 12C:
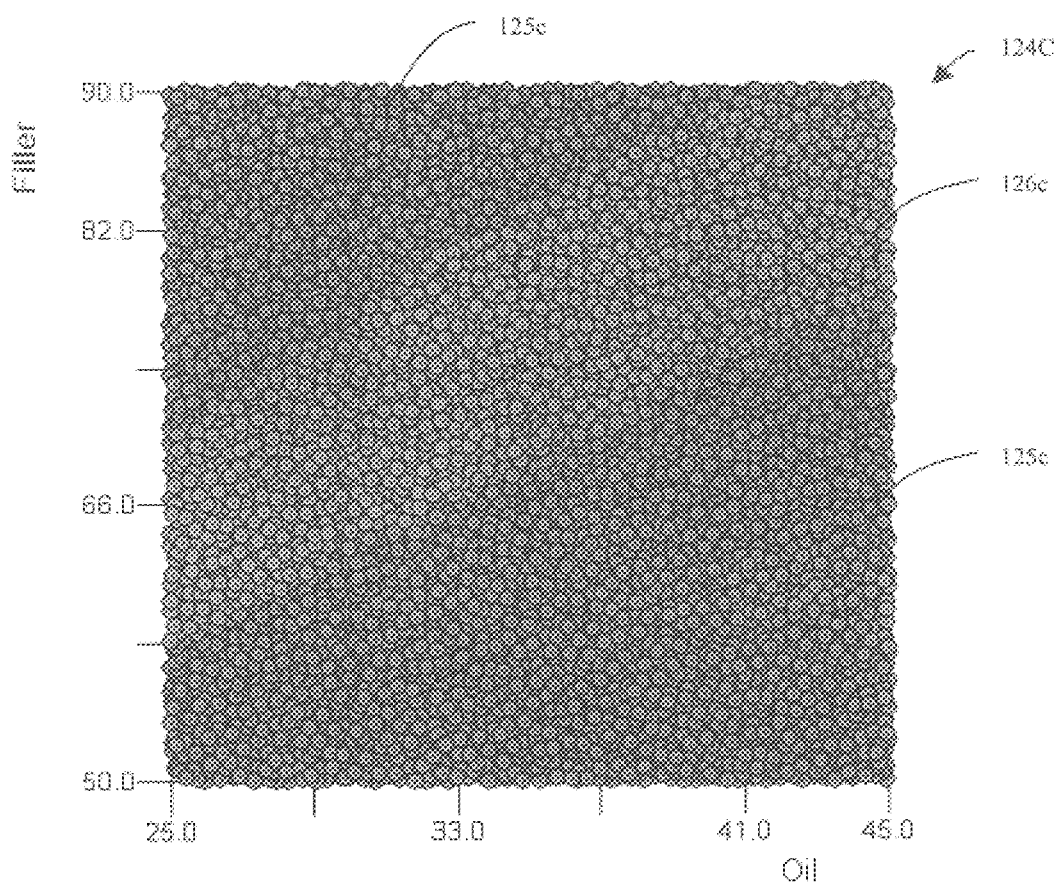
FIG. 12C shows the corresponding points (green color, 126c) in the axes of independent variables Oil-Filler (concentration of rubber ingredients in the sample)

Now we can start Functional Constraints' graphical analysis applying $K_F$ split-criterion:

Determine functional constrains $C_i^*$ and $C_i^{**}$, i=1, . . . , t in interactive mode;

Check every point of the dataset to see if it matches split-criterion $K_F$ (belongs to the subset I or subset E)—see FIG. 11;

If current point belongs to a subset I then draw it in green color on all charts, otherwise draw it in red color—see FIGS. 12A–12C.

For example: we wish to observe a graphical pattern for all possible concentrations of rubber ingredients that deliver hardness H within a certain interval of values. In this case we will use a function $H=f(\alpha)$, and check all points by condition $C^* \leq f(\alpha) \leq C^{}$. All points that match the requirement (subset I, see 126a, 126c) will be drawn in green color, all others (subset E, see 125a, 125c)—in red color—see FIGS. 12A–12C. Absence of any pattern on the chart Sulfur-Antidegradant (124B**) is an evidence of insufficient dependency between properties Flex, Hard and ingredients Sulfur, Antidegradant.

We can use as many functional constraints as we need. For example, we can also introduce a functional constraint for flexibility of the rubber in addition to previous constraint. In this case we will check each point by constraints for hardness and flexibility.

A distinctive feature of such graphical analysis is usage of interactive mode, especially in the case of several functional constraints. Occasionally a user can set constraints for some functions too high, and get an empty subset I (no points match the constraints) as a result. Interactive adjustment of constraints will be highly helpful in this situation, especially if the user sees how many points were filtered by each constraint and can adjust the strongest constraint.

Criteria Constraints Graphical Analysis

Figure 13:
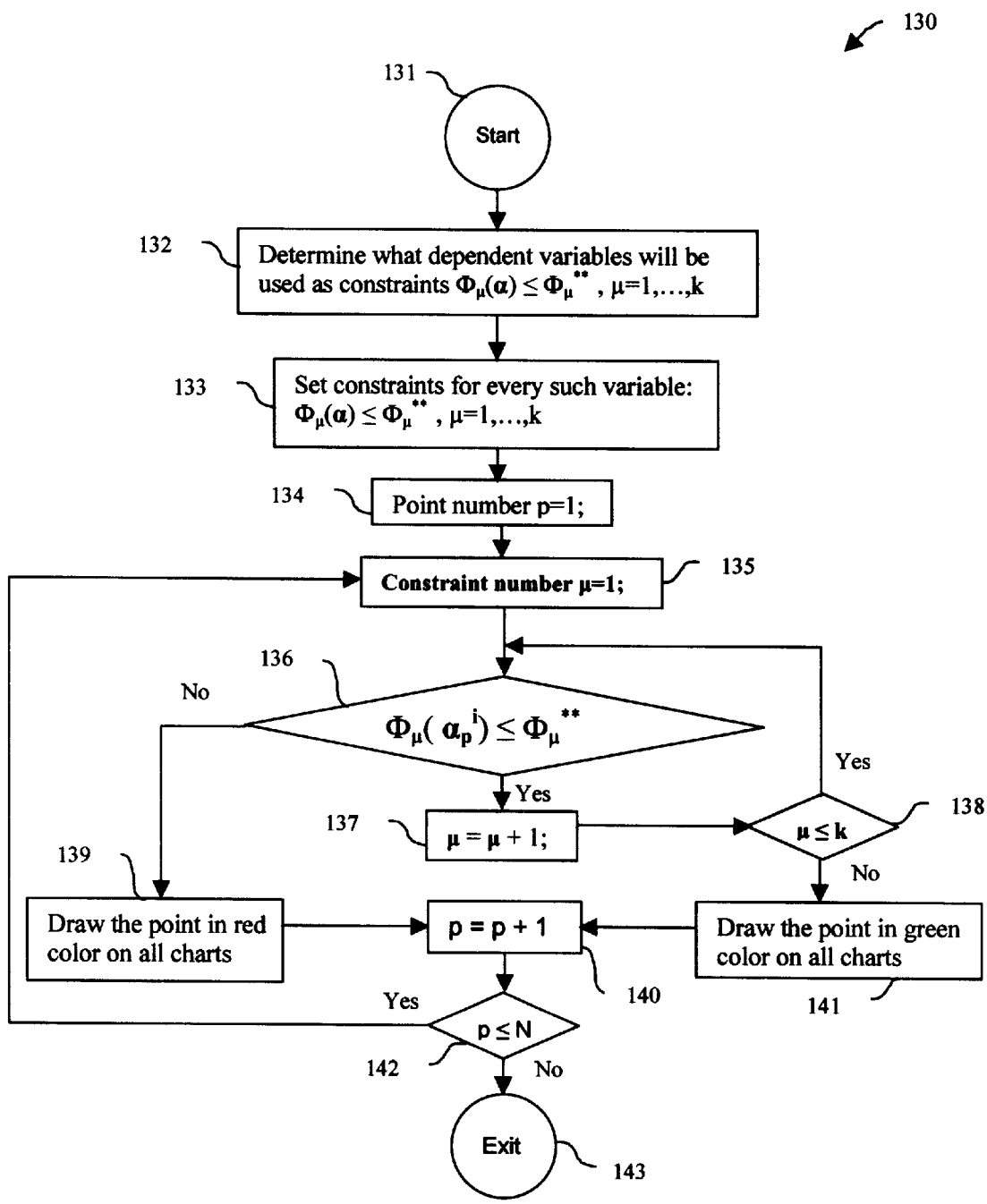
FIG. 13 is a flowchart for "Criteria Constraints" method of graphical analysis.

FIG. 13 is a flowchart for "Criteria Constraints" method of graphical analysis. FIG. 13 shows the sequence of steps to perform "Criteria Constraints" method of graphical analysis.

Assume that we have formulated multi-objective optimization task (2)–(5) and have performed the first step of graphical analysis—approximation of multi-dimensional surface by a discrete dataset. As a result, we have a dataset to analyze and, split-criterion in form of $\phi_\mu(\alpha) \leq \phi_\mu^{**}$, $\mu=1, \ldots, k$ to split the dataset on two subsets: I (internal points that match constraints (3), green color) and E (external points that don't match constraints (3), red color).

Figure 14A:
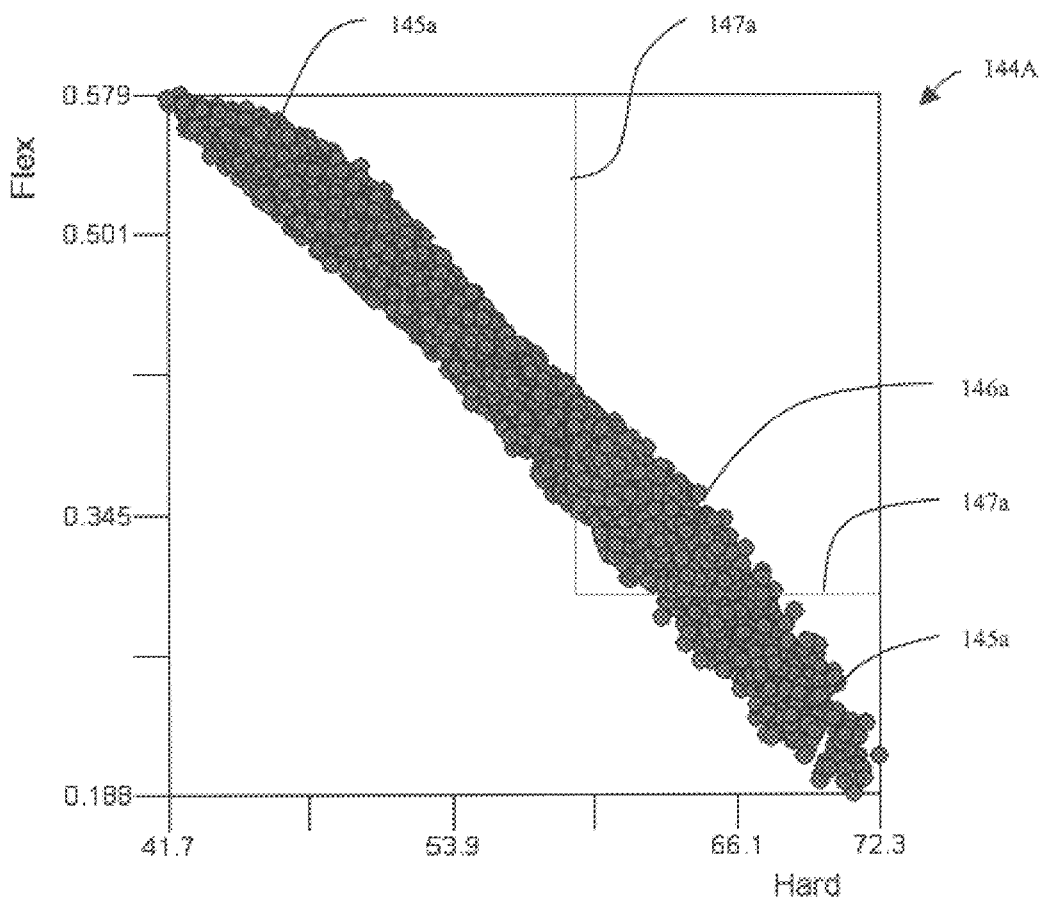
FIG. 14A shows points that match criteria constraints for hardness and flexibility (green color, 146a) selected by movable and resizable rectangle in axes of dependent variables Flexibility-Hardness (rubber mechanical properties in the sample)
Figure 14B:
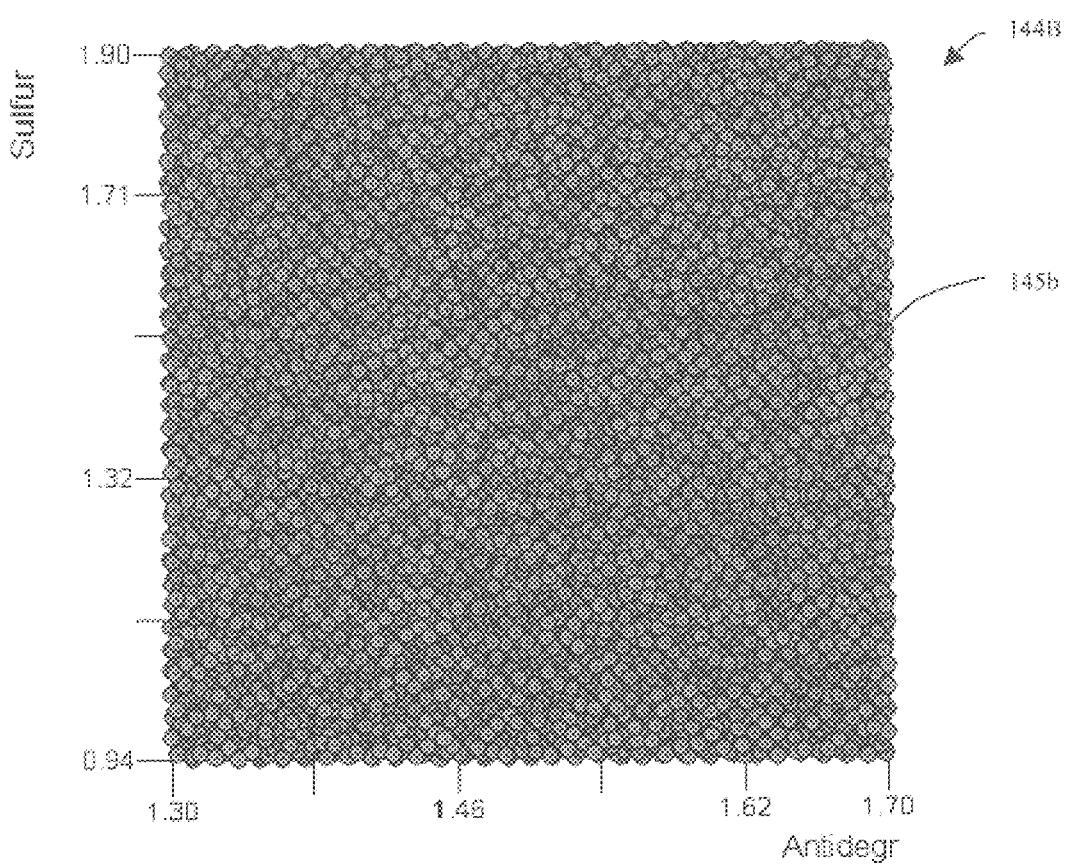
FIG. 14B shows the corresponding points (green color, 145b) in the axes of independent variables Sulfur-Antidegradant (concentration of rubber ingredients in the sample)
Figure 14C:
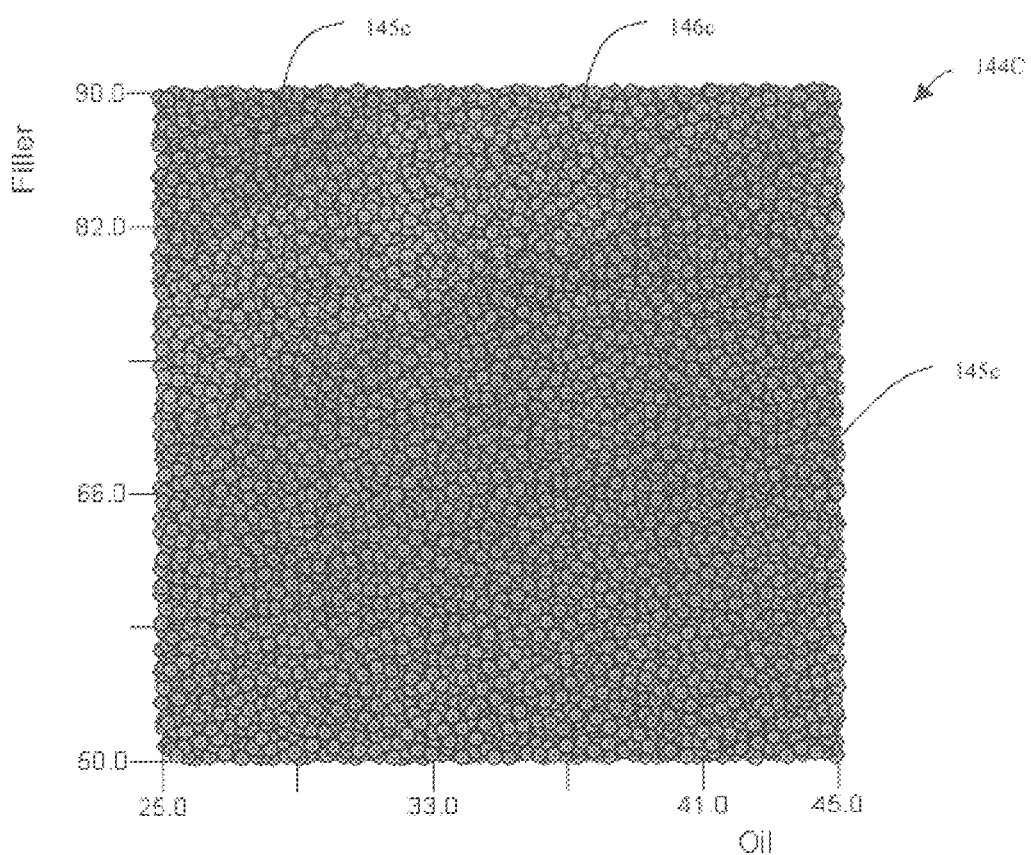
FIG. 14C shows the corresponding points (green color, 146c) in the axes of independent variables Oil-Filler (concentration of rubber ingredients in the sample)

Now we can start Criteria Constraints' graphical analysis applying $K_\phi$ split-criterion:

Determine functional constrains and $\phi_\mu^{**}, \mu=1, \ldots, k$ in interactive mode;

Check every point of the dataset to see if it matches split-criterion $K_F$ (belongs to the subset I or subset E)—see FIG. 13;

If current point belongs to the subset I then draw it in green color on all charts, otherwise draw it in red color—see FIG. 14A–14C.

FIG. 14A shows points that match criteria constraints for hardness and flexibility (green color, 145a), and don't match (red color, 145*a*). Constraints are determined in the interactive mode graphically by moving of the appropriate sides of rectangle (147*a*) in the axes of dependent variables Flexibility-Hardness (rubber mechanical properties in the sample).

FIG. 14C shows corresponding points (green color, 146*c*) in the axes of independent variables Oil-Filler (concentration of rubber ingredients in the sample).

Criteria Constraints Graphical Analysis is a vital part in solving practical tasks because in this analysis we determine the worst acceptable values of quality criteria. It is easy to determine such limits for criteria of quality (since we have quality requirements), but to see areas of acceptable values for independent variables. The graphical analysis solves this task in an easy and simple way—see FIGS. 14A–14C.

FIGS. 14A–14C show a sample with just two criteria: hardness and flexibility. This method can be used for solving tasks with larger number of criteria in the same way. The only difference is the necessity to determine criteria constraints on several charts with appropriate dependent variables. After that, each point will be checked by every criterion constraint and drawn in green or red color.

Multi-Objective Optimization Graphical Analysis

Figure 15:
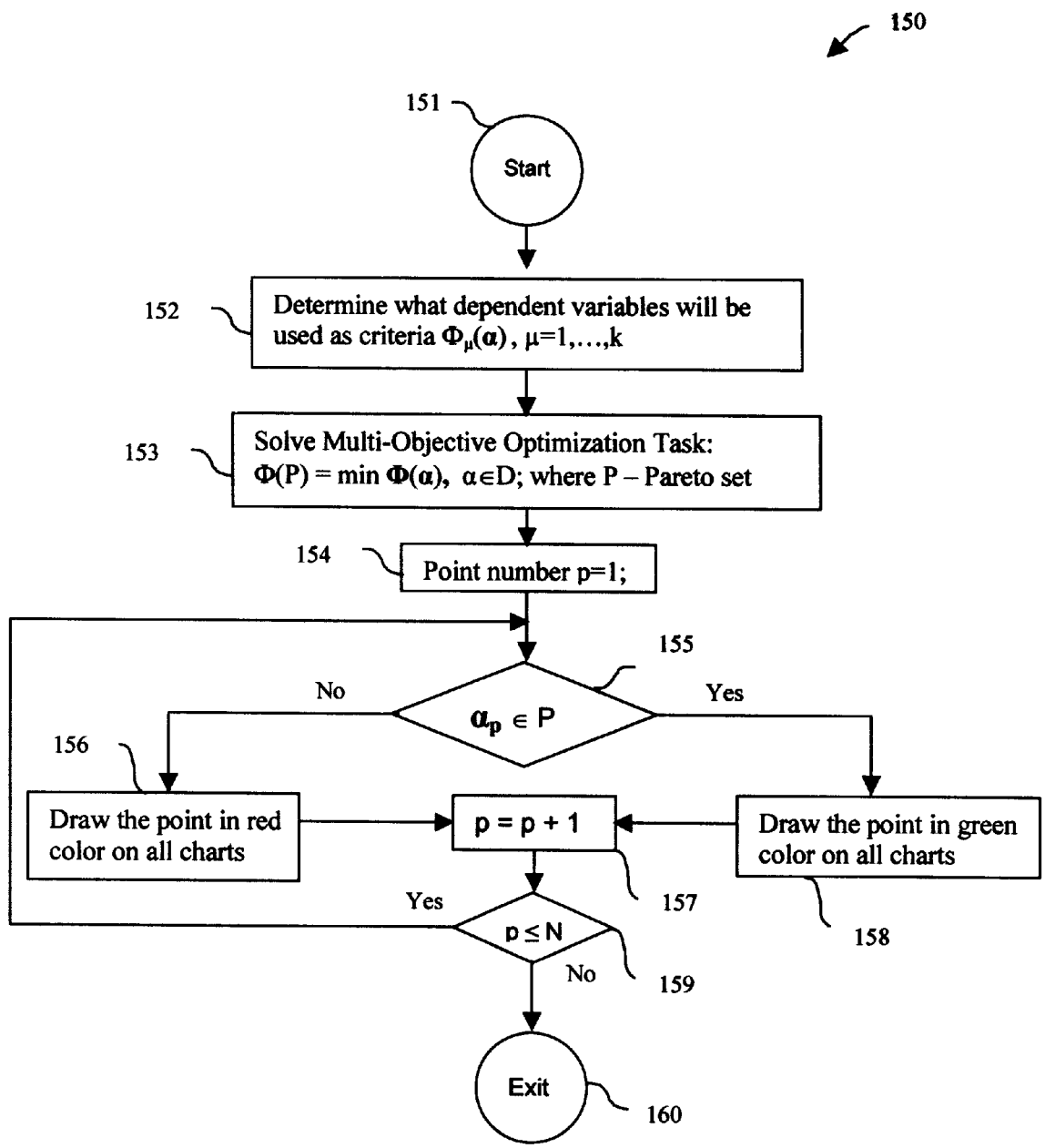
FIG. 15 is a flowchart for "Multi-Objective Optimization" method of graphical analysis.
Figure 16A:
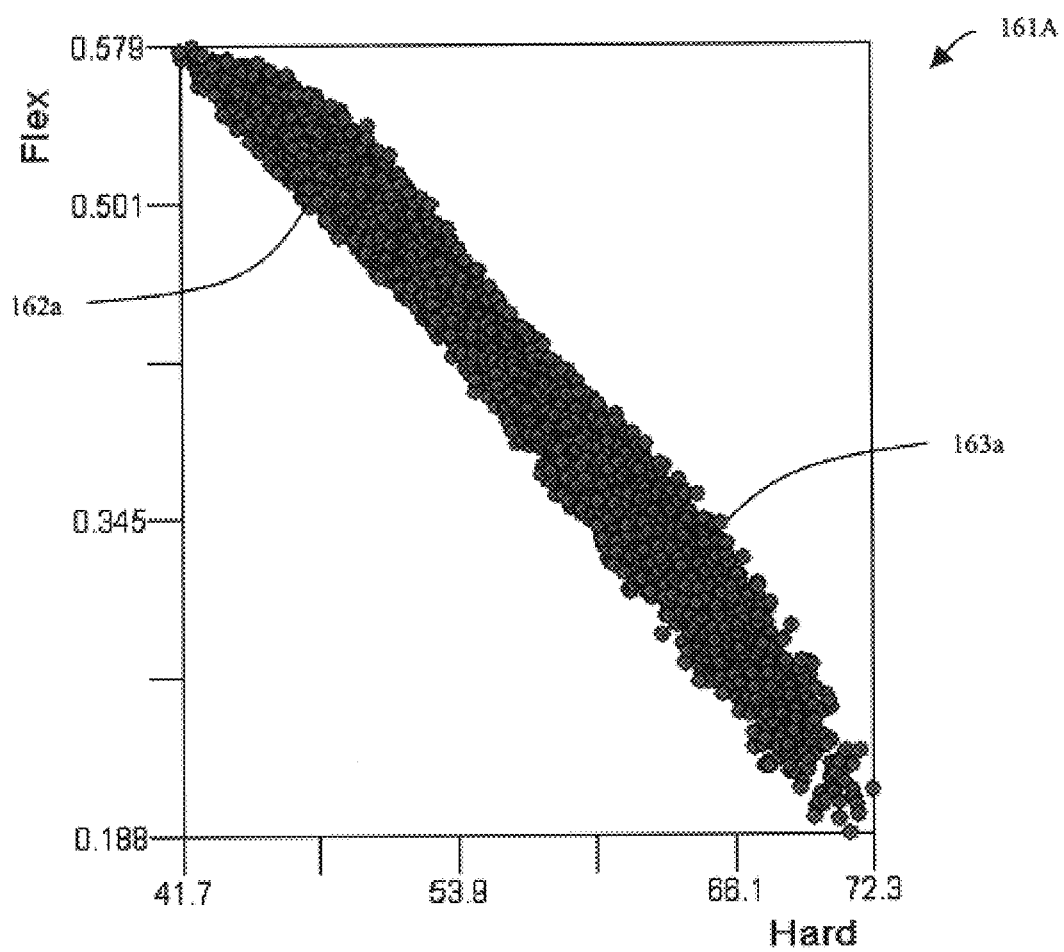
FIGS. 16A through 16F are a result of "Multi-Objective Optimization" method of graphical analysis. Green points (163a, 162b, 162d, 162e) correspond to the solution of Multi-Objective Optimization task named Pareto-set.
Figure 16B:
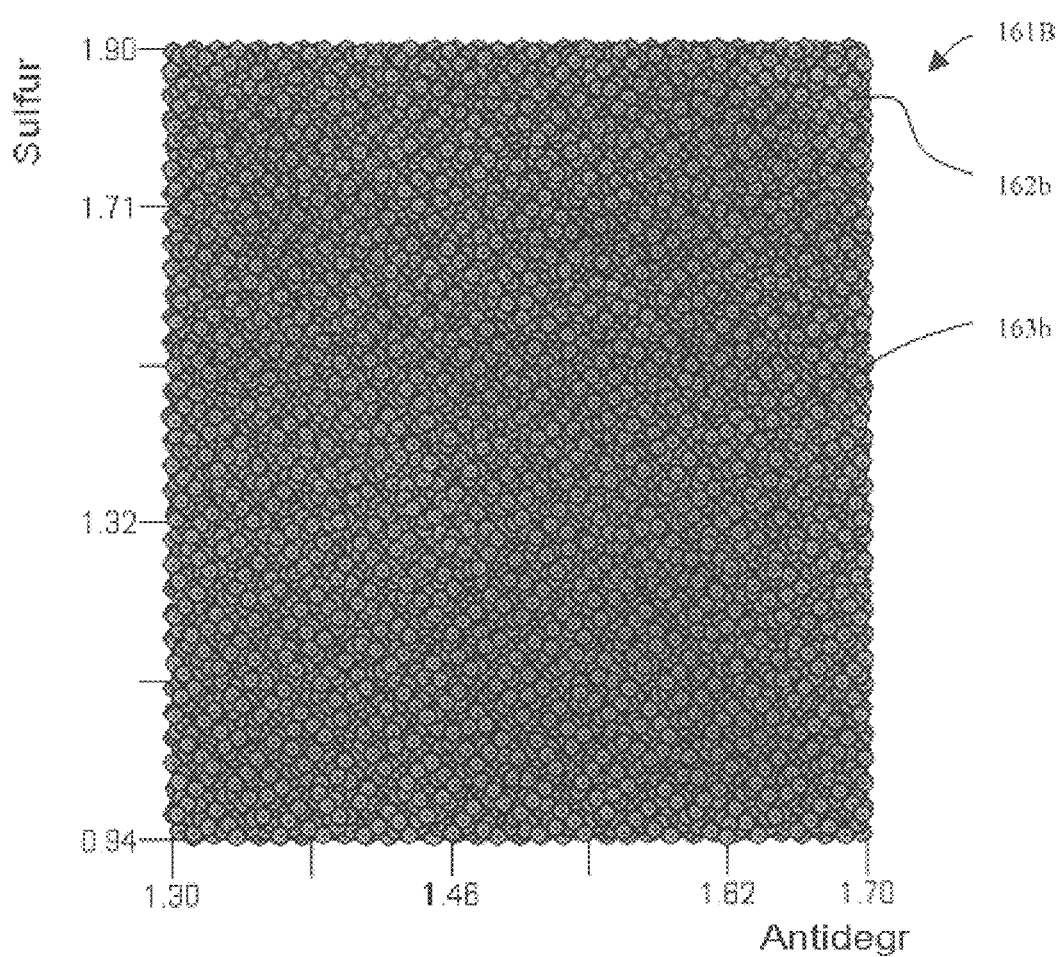
Figure 16C:
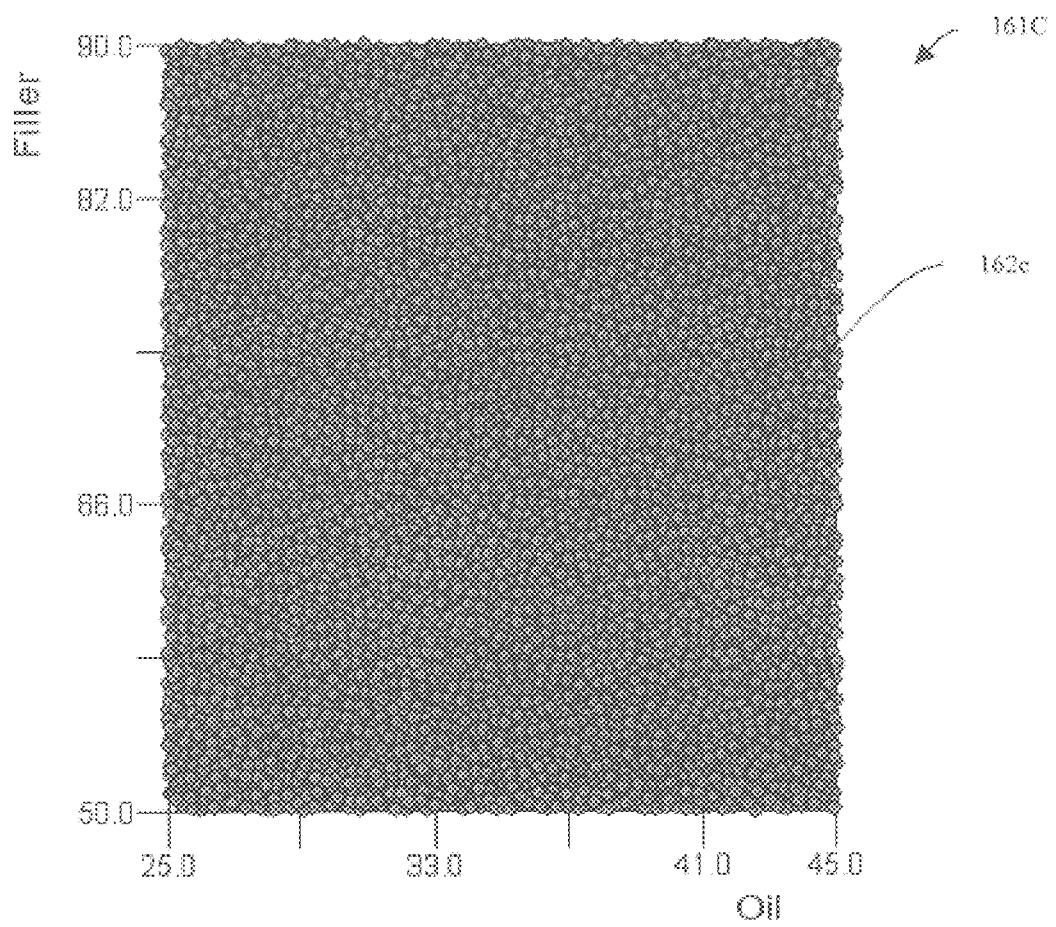
Figure 16D:
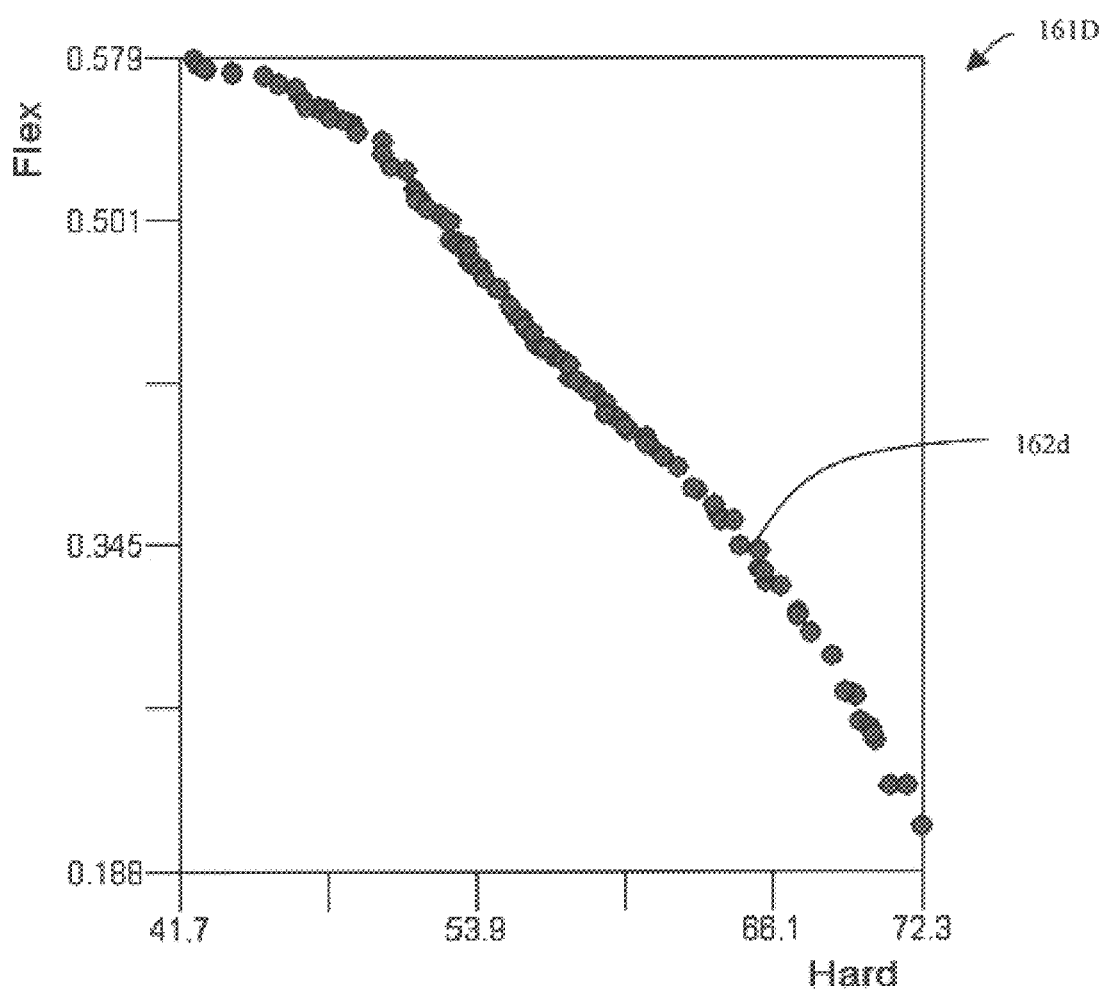
Figure 16E:
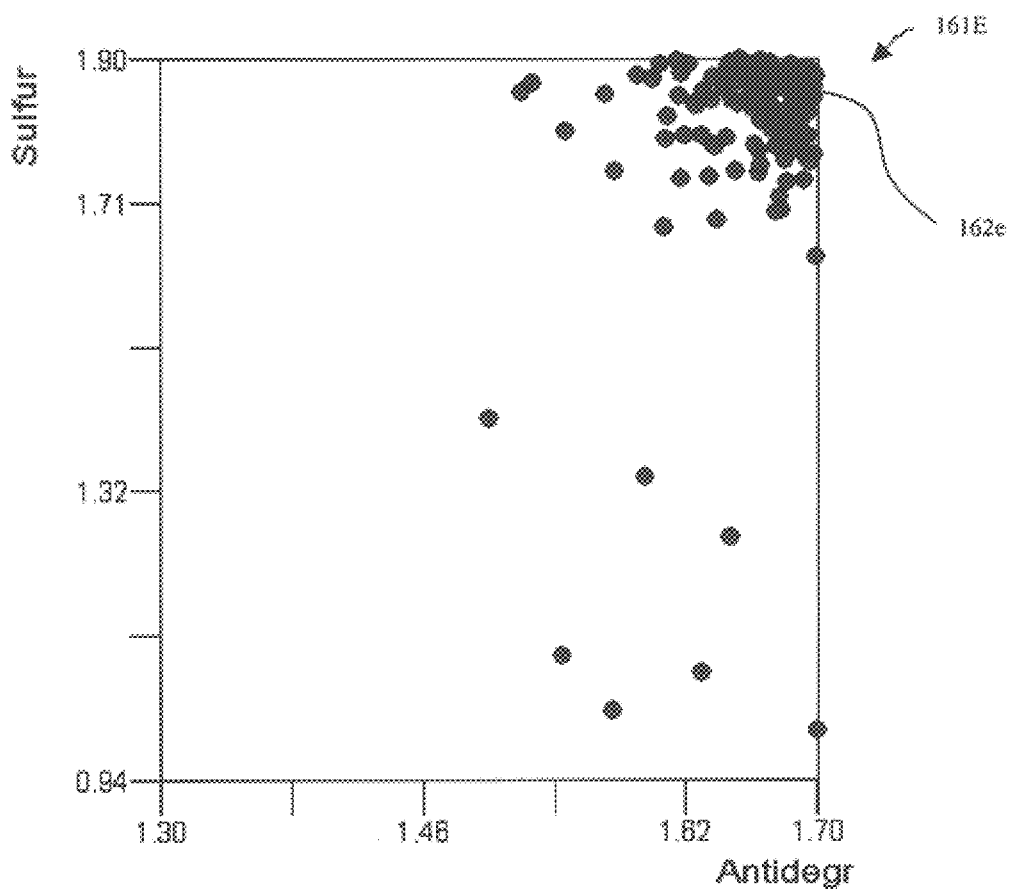
Figure 16F:
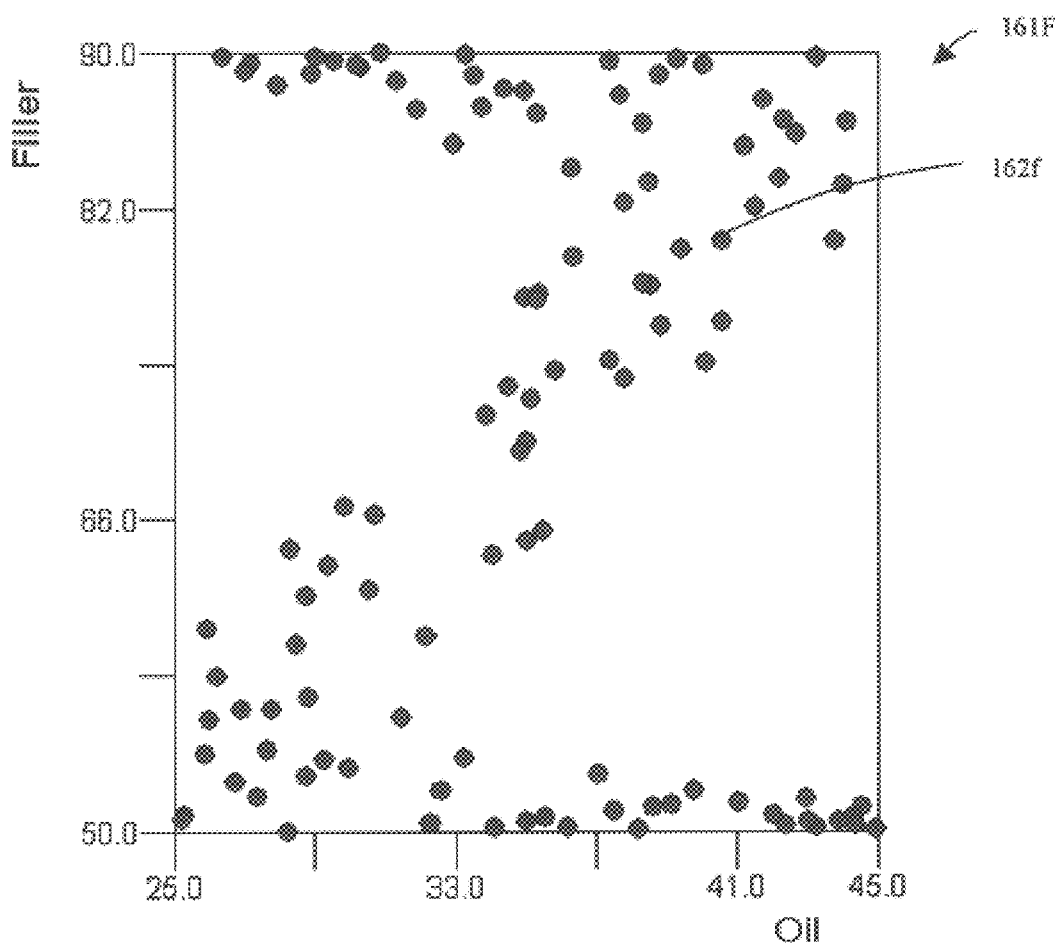
Figure 17A:
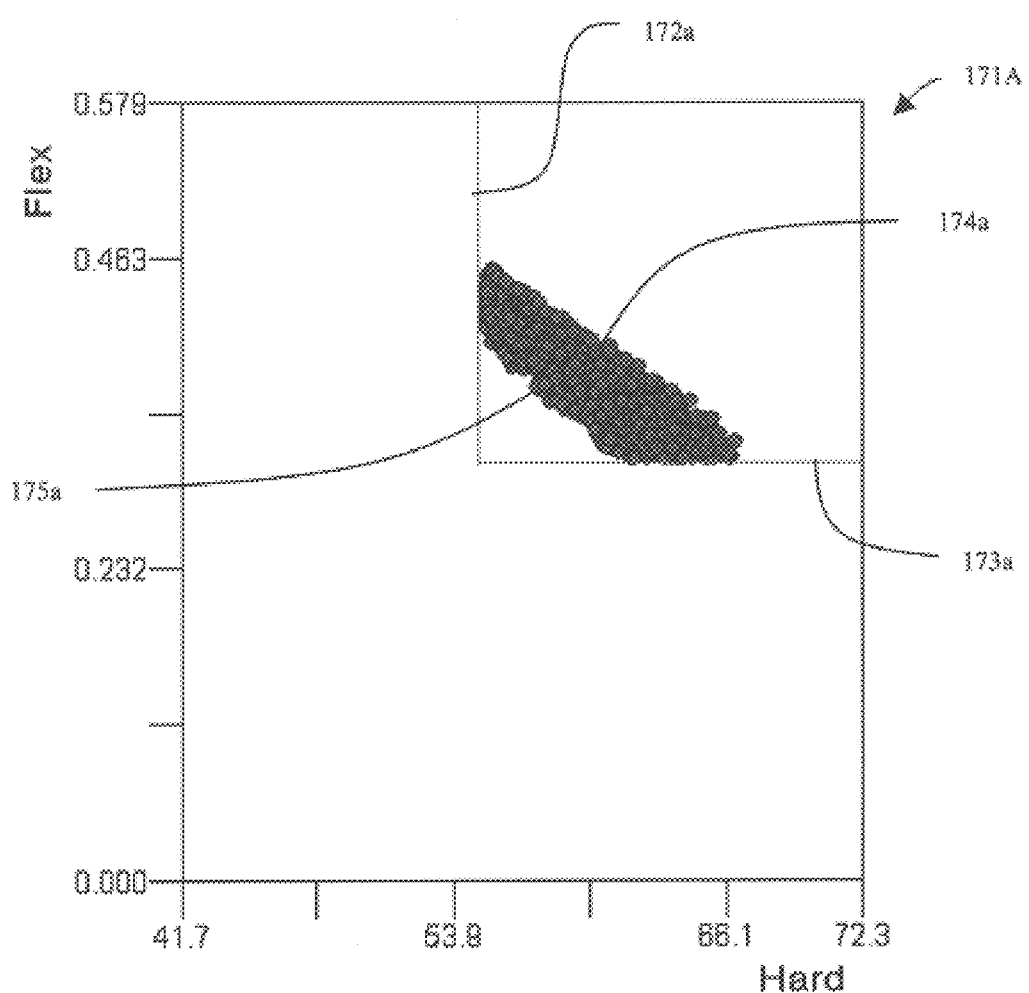
FIGS. 17A, 17B and 17C are a result of combined split-criterion: Multi-Objective Optimization and Criteria Constraints. Green points (174a, 172b, 173c) correspond to the part of Pareto-set (the solution of Multi-Objective Optimization task) which matches criteria constraints (see 172a, 173a)
Figure 17B:
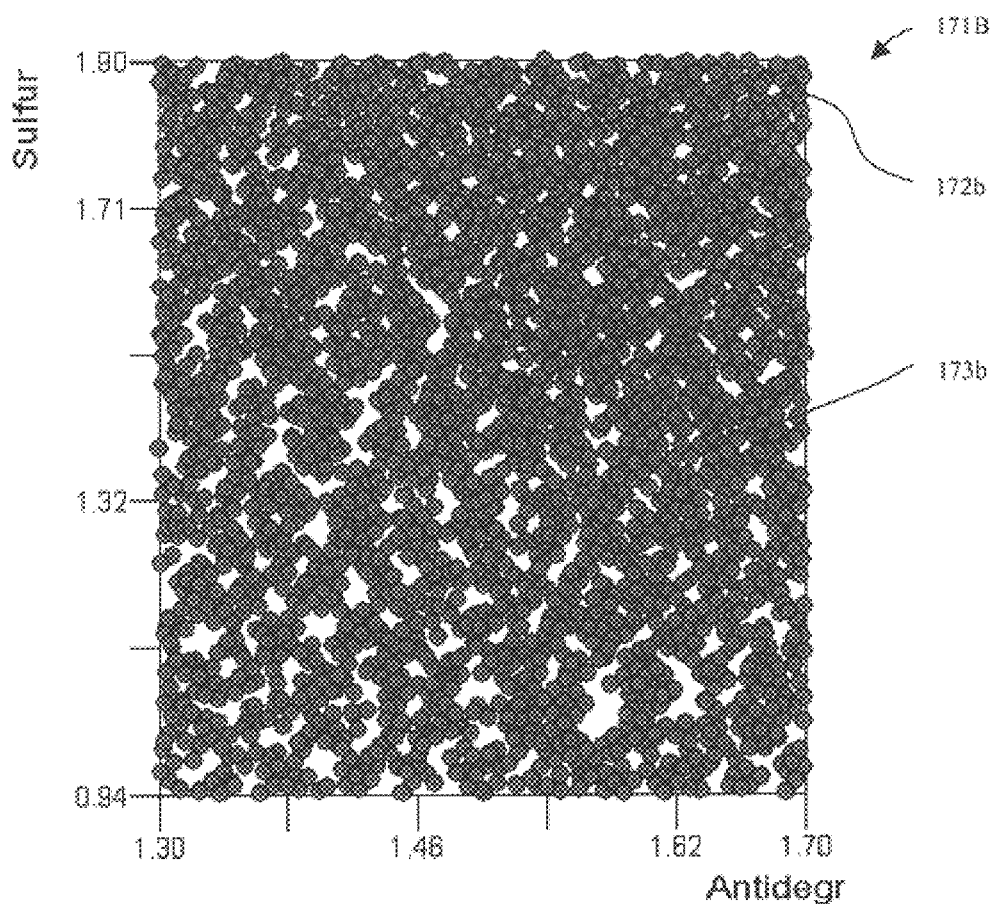
Figure 17C:
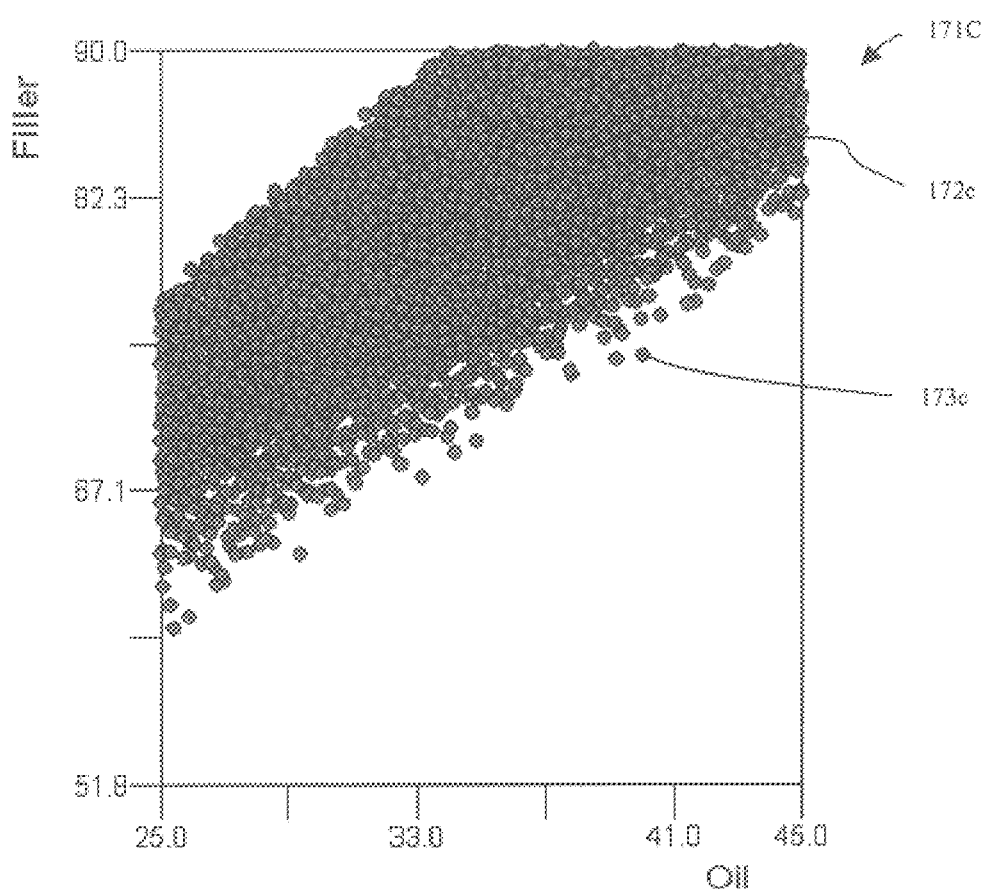

FIG. 15 is a flowchart for "Multi-Objective Optimization" method of graphical analysis.

FIGS. 16A–16F is a result of "Multi-Objective Optimization" method of graphical analysis. Green points (163*a*, 162*b*, 162*d*, 162*e*) correspond to solution of Multi-Objective Optimization task named Pareto-set.

This kind of graphical analysis is very important because it gives the most meaningful information about the location and configuration of Pareto-set which is a solution of Multi-Objective Optimization Task. It is important to configure charts with dependent and independent variables separately, and analyze pattern of Pareto-set in the space of independent variables.

Using variants that don't belong to the Pareto-set does not guarantee the best possible solution even if it belongs to the area of acceptable values (3) (FIG. 14A–14C), because Pareto-set always has at least one point that is better by all criteria at the same time. So, it is interesting to see a pattern of Pareto-set graphically, and have an opportunity to compare it with the patterns of other types of graphical analysis.

For example, look at FIGS. 8B–8C, FIGS. 10B–10C, FIGS. 10E–10F, FIGS. 12B–12C, and FIGS. 14B–14C. We cannot see any pattern on the charts with Antidegradant-Sulfur, which means that hardness and flexibility of the rubber do not depend on ingredients' Antidegradant and Sulfur concentration. On all charts with Filler and Oil, we see a pattern reflecting a strong dependency. But if we look at FIGS. 16B–16C we will see the opposite picture: strong dependency on ingredients Antidegradant-Sulfur, and no dependency on Filler-Oil. How does one interpret such an apparent contradiction? Actually, there is no contradiction: Flexibility and hardness of the rubber strongly depend on ingredients Filler-Oil, but rubber with excellent quality is supposed to have higher concentrations of Antidegradant and Sulfur. Low concentrations of Antidegradant-Sulfur will give us worse properties for the same concentration of Filler-Oil. This effect was invisible for all other methods of graphical analysis.

Combined Criteria Graphical Analysis

All of the above-described methods of graphical analysis can be used concurrently in any combination.

For example, we can perform the following steps:

Apply split-criteria of Multi-Objective Optimization Graphical Analysis $K_p$ and split UDS points on 2 subsets: Pareto-points (green) and non-Pareto points (red);

Apply Criteria Constraints split-criteria $K_\phi$; Now Pareto-points that don't match $K_\phi$ criteria become red, shrinking the area of green points;

Apply Area of Interest split-criteria $K_A$; Now some of green points that don't belong to the area of interest become red.

Finally, in the set of internal points I we have only the Pareto-points that match Criteria Constraints, and belong to our area of interest. Therefore, we can sufficiently reduce the number of the acceptable points making the selection of the best solution of the task much easier.

Cuts And Projections Graphical Analysis

Figure 18:
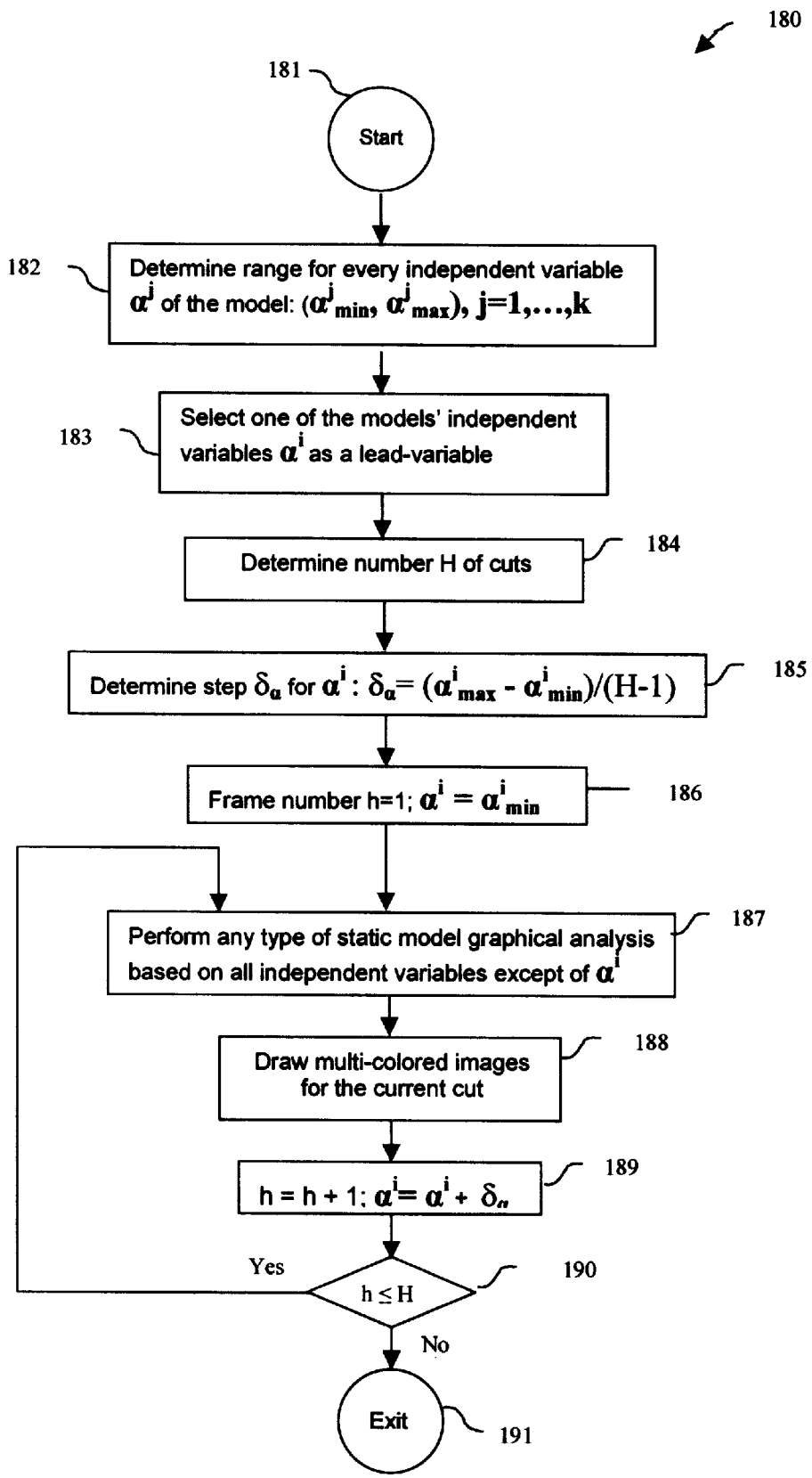
FIG. 18 is a flowchart for "Cuts And Projections" method of graphical analysis.

FIG. 18 is a flowchart for a method of graphical analysis based on cuts and projections. FIG. 18 shows the sequence of steps to perform cuts and projections graphical analysis.

All of the above described methods of graphical analysis use UDS generated in n-dimensional parallelepiped, where n—number of independent variables. Those methods don't use cuts of visualized functions, just projections.

Cuts and Projections Graphical Analysis uses a combination of cuts and projections.

The method selects one of independent variables as a lead-variable, and creates a sequence of cuts for sequential values of the lead-variable (see FIG. 18).

Each cut is an (n−1)-dimensional function Y=F(X'), where X' is (n−1) independent variables and one constant value of the lead-variable. Y=F(X') can be visualized using any described method of graphical analysis. (n−1)-dimensional UDS will be used to create discrete approximation of the function Y=F(X').

The result of such visualization will be a set of two-dimensional projections. Sequential values of the lead-variable cause a graphical difference on projections for different cuts. So, comparing slightly different images on several two-dimensional projections shows how the visualized function depends on the lead-variable.

Two different approaches can be used to organize graphical presentation of such two-dimensional projections in order to make comparing easier: Animation with lead-variable working as time variable, and three-dimensional visualization with lead-variable working as third dimension (see FIG. 19).

Animation graphical analysis for the function Y=F(X), where Y={$y_1, \ldots, y_k$}, X={$\alpha_1, \ldots, \alpha_n$}, n—number of independent variables, k—number of dependent variables, includes following steps:

Determine range for every independent variable $\alpha^j$ of the model: ($\alpha^j_{min}, \alpha^j_{max}$), j=1, ... ,n;

Select an independent variable $\alpha^i$ as lead-variable;

Determine a cut of the function Y=F(X) by assignment of a constant value to the lead-variable: $\alpha^i = \alpha^i_{min}$;

Generate points of UDS in parallelepiped ($\alpha^i_{min}, \alpha^i_{max}$), j=1, ... , n−1 excluding variable $\alpha^i$;

Calculate values of function Y=F(X) in the points of UDS;

Use a split-criterion to divide the dataset in two or more non-intersecting subsets;

Draw each subset in distinct color on plurality of two-dimensional projections;

Determine next cut of the function Y=F(X) by assignment $\alpha^i = \alpha^i + \delta_\alpha$, where $\delta_\alpha = (\alpha^i_{max} - \alpha^i_{min})/(H-1)$, H—the number of frames in the animation movie;

Repeat above 5 steps H−1 times to generate and expose all frames of the animation.

There are several possible scenarios for the Animation graphical analysis:

Increment or decrement the lead-variable during animation process;

Use more then one lead-variable. In this case summarized effect of the lead-variables will be shown during animation;

Move values of several lead-variables in opposite directions: increment part of them and decrement another part.

Figure 19:
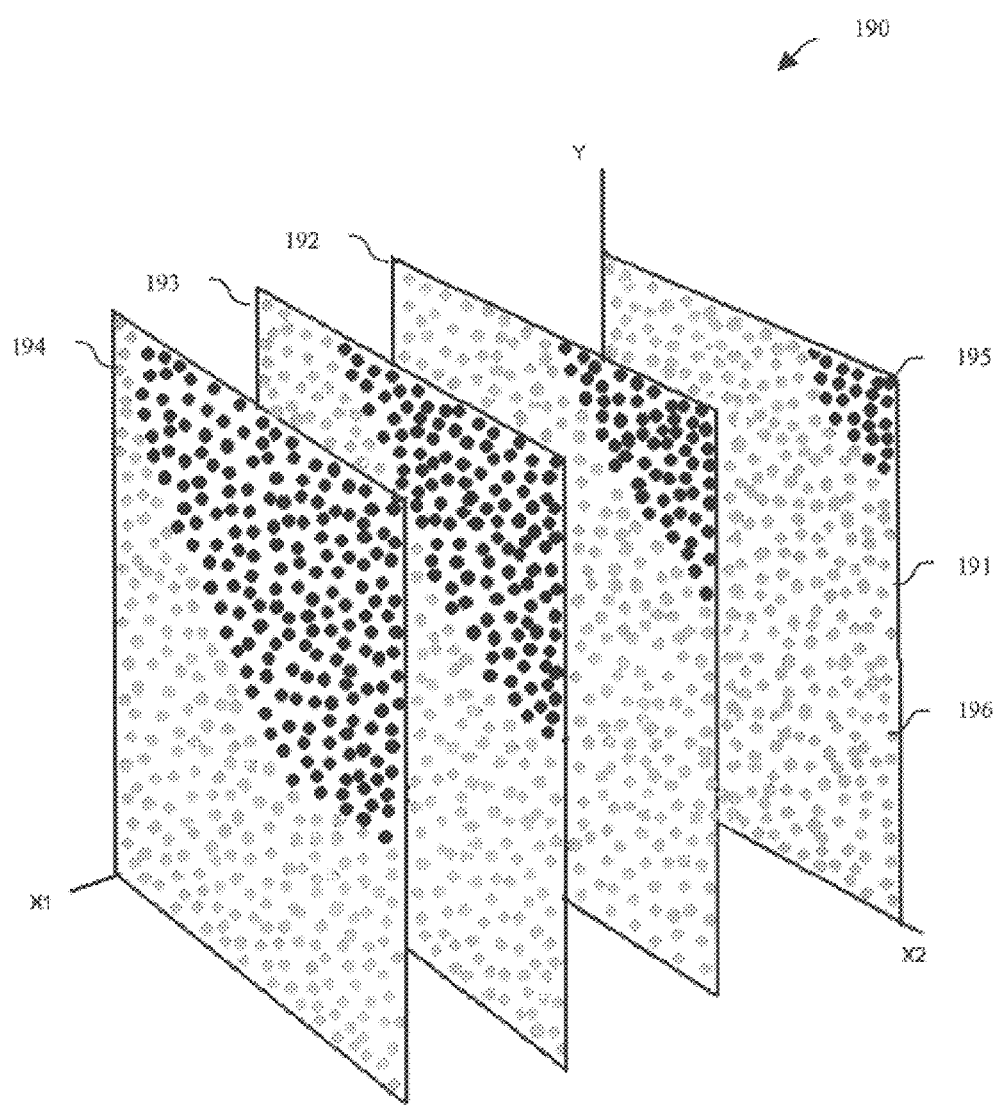
FIG. 19 is a result of "Cuts And Projections" method of graphical analysis. Projections (191, 192, 193, 194) can be considered as frames of animation movie those consequently substitute each other in animation process, or as parts of static three-dimensional image those are visible at the same time.

The above algorithm can also be used for three-dimensional visualization (see FIG. 19). Axis of the lead-variable (X1 on FIG. 19) creates an additional third dimension of the chart. In this case instead of sequential substitution of the frames (or two-dimensional projections) on a two-dimensional chart all of them can be shown at the same time on a three-dimensional chart as a sequence of flat multi-colored projections. Each projection (see 191, 192, 193, 194) on FIG. 19 corresponds to own value of the lead-variable.

Projections (191, 192, 193, 194) on FIG. 19 can be considered as frames of an animation movie that sequentially substitute for each other in the animation process, or as parts of three-dimensional image that are static and visible at the same time.

While the present invention has been described in connection with the illustrated embodiments, it will be appreciated and understood that modifications may be made without departing from the true spirit and scope of the invention which is limited only by the appended claims and their equivalents.

I claim:

1. A method for graphically analyzing at least one function considered in a multi-dimensional domain, the method comprising the steps of;

producing of a set of points in a multi-dimensional domain by means of a distributed sequences (DS) generator using any distribution other than lattice and grid-like distributions;

calculating values of said at least one function for each point of said DS and thereby creating an approximation of said function by a discrete dataset;

projecting said discrete dataset on a plurality of two-and three-dimensional planes to yield details of said discrete dataset's multidimensional configuration for graphical analysis.

2. The method of claim 1 wherein said distributed sequences generator is a uniformly distributed sequence (UDS) generator.

3. The method of claim 2 wherein said UDS generator is an algorithm using formula $q_{i,j}=e_1 V_j^{(1)} * e_2 V_j^{(2)} * \ldots * e_m V_j^{(m)}$, $j=1, \ldots, n$, for calculation of all coordinates of a point $Q_i=(q_{i,1}, \ldots, q_{i,n})$, where i is a number of said point in said uniformly distributed sequence, represented as $i=e_m \ldots e_1$, and * denotes a digit-by-digit modulo two addition in binary notation.

4. The method of claim 1, further comprising the steps of:

determining a split-criterion for the purpose dividing said discrete dataset into a plurality of non-intersecting subsets whereby each subset will be drawn in distinct color;

applying said split-criterion for each point of said discrete dataset to determine in which subset the point belongs.

5. The method of claim 4 wherein said split-criterion divides said discrete dataset into more than two non-intersecting subsets.

6. The method of claim 5 wherein said split-criterion is a "Contour" criterion.

7. The method of claim 4 wherein said split-criterion divides said discrete dataset into two non-intersecting subsets.

8. The method of claim 7 wherein said split-criterion is an "Area of Interest" criterion.

9. The method of claim 5 wherein said split-criterion is a "Functional Constraints" criterion.

10. The method of claim 7 wherein said split-criterion is a "Criteria Constraints" criterion.

11. The method of claim 7 wherein said split-criterion is a "Multi-Objective Optimization" criterion.

12. The method of claim 7, wherein said split-criterion consists of at least two of the following criteria: Contour criterion, Area of Interest criterion, Functional Constraints criterion, Criteria Constraints criterion and Multi-Objective Optimization criterion.

13. A method for graphically analyzing a plurality of functions considered in a multi-dimensional domain, the method comprising the steps of:

producing of a set of points in a multi-dimensional domain by means of a uniformly distributed sequences (UDS) generator using any uniform distribution other than lattice and grid-like distributions;

calculating values of said plurality of functions for each point of said UDS and thereby creating an approximation of said functions by a discrete dataset;

dividing said discrete dataset into a plurality of non-intersecting subsets by means a split-criterion whereby each subset will be drawn in distinct color;

projecting said discrete dataset on a plurality of two- and three-dimensional planes to yield details of said discrete dataset's multidimensional configuration.

14. The method of claim 13 wherein said UDS generator is an algorithm using formula $q_{i,j}=e_1 V_j^{(1)} * e_2 V_j^{(2)} * \ldots * e_m V_j^{(m)}$, $j=1, \ldots, n$, for calculation of all coordinates of a point $Q_i=(q_{i,1}, \ldots, q_{i,n})$, where i is a number of said point in said uniformly distributed sequence, represented as $i=e_m \ldots e_1$, and * denotes a digit-by-digit modulo two addition in binary notation.

15. The method of claim 13 wherein parameters of said split-criterion are determining in an interactive mode whereby images on said plurality of two-and three-dimensional planes become graphically useful.

16. The method of claim 13 wherein the number of said plurality of two-and three-dimensional planes and the configuration of each of them are determining in an interactive mode whereby generated images on said plurality of two-and three-dimensional planes become graphically useful.

17. The method of claim 13 wherein the number of said plurality of two-dimensional planes is determined by the formula $(C^2_{(n+m)})/2$ whereby all possible combinations of two axes present on the two-dimensional planes become graphically useful.

18. The method of claim 13 wherein the number of said plurality of three-dimensional planes is determined by the formula $(C^3_{(n+m)})/3$ whereby all possible combinations of three axes present on the three-dimensional planes become graphically useful.

19. A method for graphically analyzing a plurality of functions considered in an n-dimensional domain, the method comprising the steps of:

a) selecting a lead-variable;

b) assigning a constant value for the lead variable to produce a cut of visualized functions and reduce the dimensions of said function by one;

c) producing of a set of points in a (n−1)-dimensional domain by means of a UDS generator using any uniform distribution other than lattice and grid-like distributions;

d) calculating values of said plurality of functions for each point of said UDS and thereby creating an approximation of said functions by a discrete dataset;

e) dividing said discrete dataset into a plurality of non-intersecting subsets by means of a split-criterion whereby each subset will be drawn in a distinct color;

f) projecting said discrete dataset on a plurality of two-dimensional planes to yield details of said discrete dataset's multidimensional configuration;

g) determining a next cut of said functions by assignment of a next sequential value for said lead-variable and repeating steps b) to f) to generate sequential cuts of said functions.

20. The method of claim 19 wherein said plurality of two-dimensional planes are sequentially exposed on the same two-dimensional projections to create an animation effect.

21. The method of claim 19 wherein said plurality of two-dimensional planes are exposed on three axes determined by said lead-variable whereby three-dimensional images are created.

* * * * *